United States Patent
Hui et al.

(10) Patent No.: US 9,641,382 B2
(45) Date of Patent: May 2, 2017

(54) FAST NETWORK FORMATION AFTER NETWORK POWER RESTORATION

(71) Applicant: Cisco Technology, Inc., San Jose, CA (US)

(72) Inventors: Jonathan W. Hui, Belmont, CA (US); Wei Hong, Berkeley, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 174 days.

(21) Appl. No.: 14/576,641

(22) Filed: Dec. 19, 2014

(65) Prior Publication Data

US 2016/0020997 A1    Jan. 21, 2016

Related U.S. Application Data

(60) Provisional application No. 62/026,955, filed on Jul. 21, 2014.

(51) Int. Cl.
*H04L 12/24* (2006.01)
*H04B 1/713* (2011.01)
*H04L 12/931* (2013.01)

(52) U.S. Cl.
CPC .......... *H04L 41/06* (2013.01); *H04B 1/713* (2013.01); *H04L 49/00* (2013.01)

(58) Field of Classification Search
None
See application file for complete search history.

(56) References Cited

U.S. PATENT DOCUMENTS

| | | | | |
|---|---|---|---|---|
| 5,553,094 | A * | 9/1996 | Johnson | G01D 4/004 324/110 |
| 9,020,008 | B2 | 4/2015 | Hui et al. | |
| 2005/0239414 | A1 * | 10/2005 | Mason, Jr. | H04W 48/18 455/69 |
| 2009/0138777 | A1 * | 5/2009 | Veillette | G01D 4/004 714/748 |
| 2009/0278708 | A1 * | 11/2009 | Kelley | G01D 4/002 340/870.39 |

(Continued)

OTHER PUBLICATIONS 802.15.4e-2012—IEEE Standard for Local and metropolitan area networks—Part 15.4: Low-Rate Wireless Personal Area Networks (LR-WPANs) Amendment 1: MAC sublayer Date of Publication :Apr. 16, 2012Status :Active pp. 1-225 E-ISBN : 978-0-7381-7204-0.*

(Continued)

*Primary Examiner* — Gary Mui
(74) *Attorney, Agent, or Firm* — Parker Ibrahim & Berg LLC; James M. Behmke; Stephen D. LeBarron

(57) ABSTRACT

In one embodiment, a first device in a network detects a power restoration event subsequent to a power outage event. Power is restored to the first device during the power restoration event. The first device synchronizes a channel hopping schedule to the detected power restoration event. The first device communicates with a neighboring device of the first device using the channel hopping schedule synchronized to the detected power restoration event. The neighboring device uses a corresponding channel hopping schedule to communicate with the first device that is also synchronized to the power restoration event.

22 Claims, 20 Drawing Sheets

(56) References Cited

U.S. PATENT DOCUMENTS

| | | |
|---|---|---|
| 2012/0192025 A1* | 7/2012 | Veillette .............. H04L 67/025 |
| | | 714/749 |
| 2013/0016759 A1 | 1/2013 | Hui et al. |
| 2013/0028295 A1 | 1/2013 | Hui et al. |
| 2013/0094536 A1 | 4/2013 | Hui et al. |

OTHER PUBLICATIONS

International Search Report and Written Opinion dated Sep. 29, 2015 in connection with PCT/US2015/040270.

Gnawali et al., "The Minimum Rank with Hysteresis Objective Function", Request for Comments 6719, Sep. 2012, 13 pages, Internet Engineering Task Force Trust.

Thubert P., "Objective Function Zero for the Routing Protocol for Low-Power and Lossy Networks (RPL)", Request for Comments 6552, Mar. 2012, 14 pages, Internet Engineering Task Force Trust.

Vasseur et al., "Routing Metrics Used for Path Calculation in Low-Power and Lossy Networks", Request for Comments 6551, Mar. 2012, 30 pages, Internet Engineering Task Force Trust.

Winter et al., "RPL: IPv6 Routing Protocol for Low-Power and Lossy Networks", Request for Comments 6550, Mar. 2012, 157 pages, Internet Engineering Task Force Trust.

\* cited by examiner

FAST NETWORK FORMATION AFTER NETWORK POWER RESTORATION

RELATED APPLICATIONS

This application claims priority to U.S. Provisional Application No. 62/026,955, filed Jul. 21, 2014, entitled: "FAST NETWORK FORMATION AFTER NETWORK POWER RESTORATION," by Hui et al., the contents of which are herein incorporated by reference.

TECHNICAL FIELD

The present disclosure relates generally to computer networks, and, more particularly, to fast network formation after network power restoration.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

In contrast to many traditional computer networks, LLN devices typically communicate via shared-media links. For example, LLN devices that communicate wirelessly may communicate using overlapping wireless channels (e.g., frequencies). In other cases, LLN devices may communicate with one another using shared power line communication (PLC) links. For example, in a Smart Grid deployment, an electric utility may distribute power to various physical locations. At each location may be a smart meter that communicates wirelessly and/or using the electrical power distribution line itself as a communication medium.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
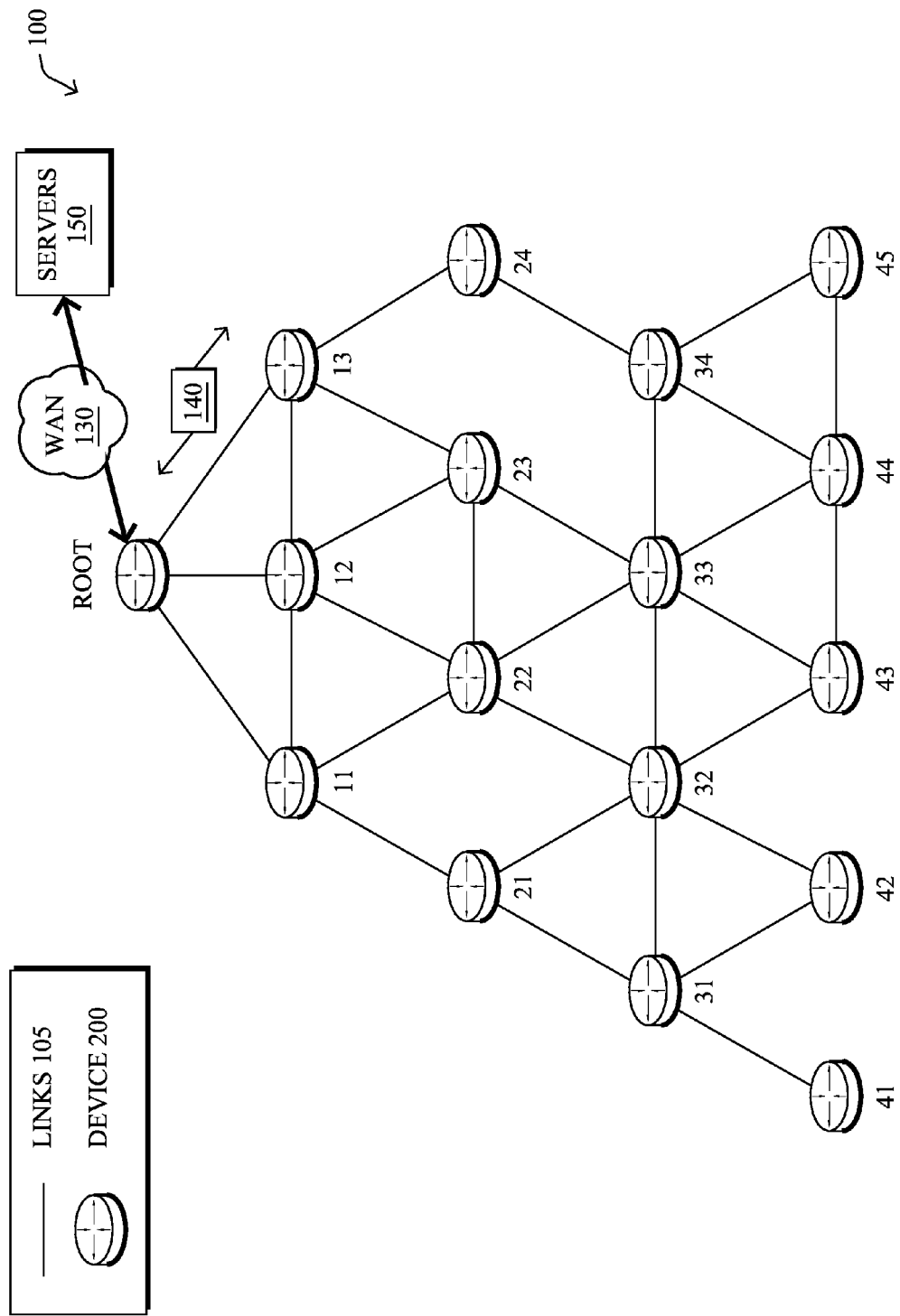
FIG. 1 illustrates an example communication network.

According to one or more embodiments of the disclosure, a first device in a network detects a power restoration event subsequent to a power outage event. Power is restored to the first device during the power restoration event. The first device synchronizes a channel hopping schedule to the detected power restoration event. The first device communicates with a neighboring device of the first device using the channel hopping schedule synchronized to the detected power restoration event. The neighboring device uses a corresponding channel hopping schedule to communicate with the first device that is also synchronized to the power restoration event.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE 1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. The illustrative root node, such as a field area router (FAR), may interconnect the local networks with a WAN 130, which may enable communication with other relevant devices such as management devices or servers 150, e.g., a network management server (NMS), a dynamic host configuration protocol (DHCP) server, a constrained application protocol (CoAP) server, an outage management system (OMS), etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
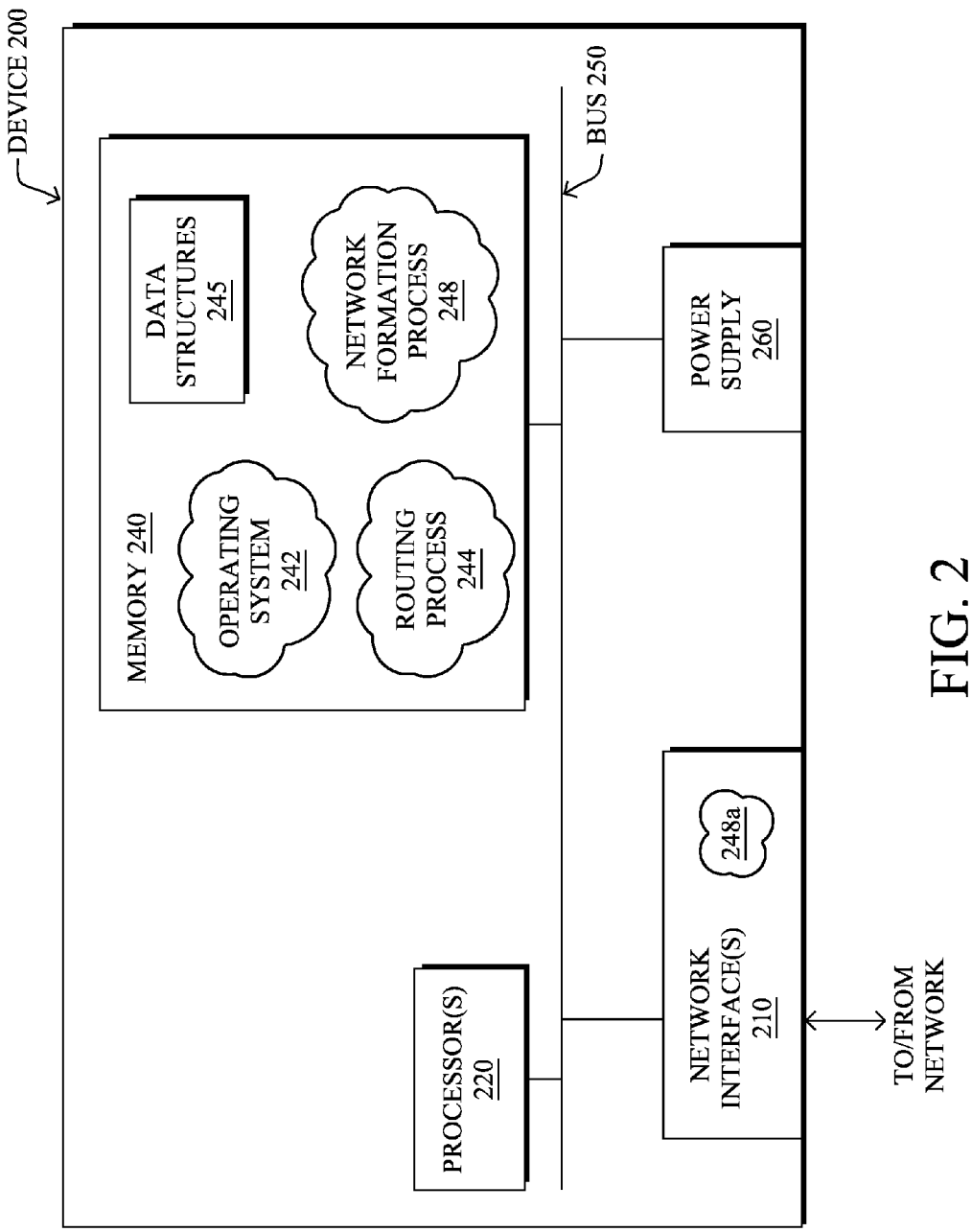
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and an illustrative network formation process 248, as described herein. Note that while process 248 is shown in centralized memory 240, alternative embodiments provide for the process to be specifically operated within the network interfaces 210, such as a component of a MAC layer (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are included in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks"<RFC 6551> by Vasseur, et al. (March 2012 version). Further, an example OF (e.g., a default OF) may be found in an IETF RFC, entitled "RPL Objective Function 0"<RFC 6552> by Thubert (March 2012 version) and "The Minimum Rank Objective Function with Hysteresis" <RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
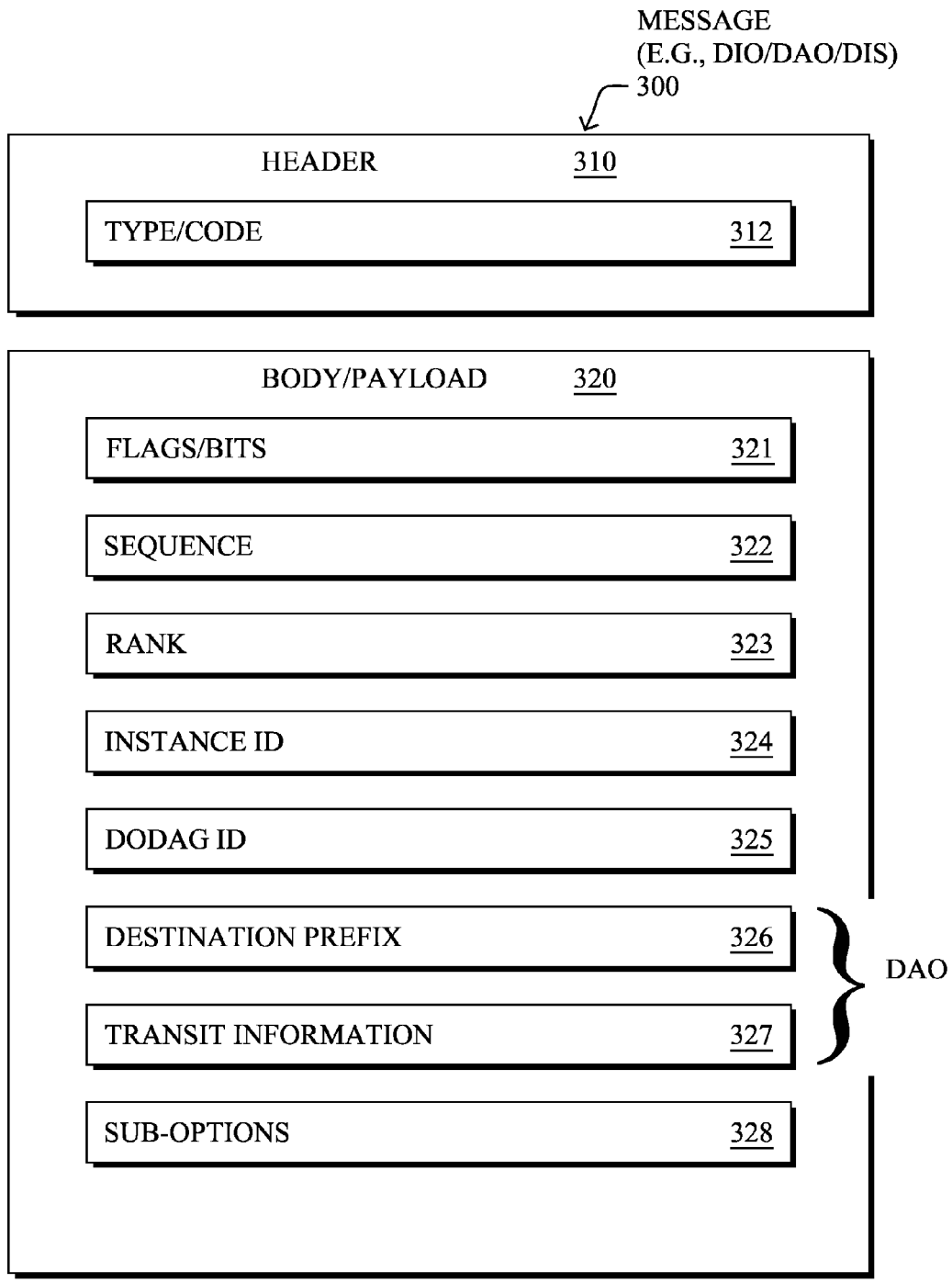
FIG. 3 illustrates an example routing protocol message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
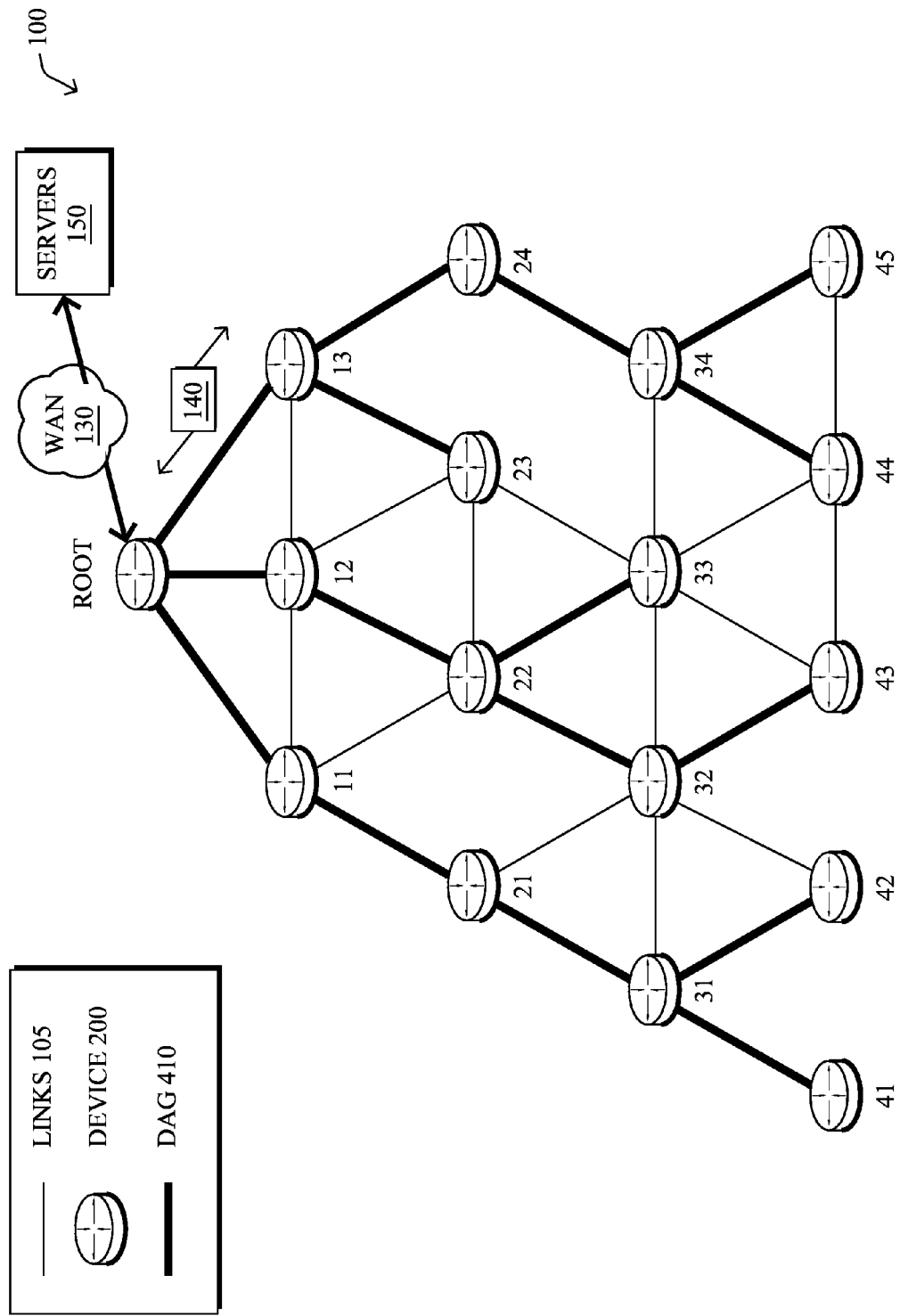
FIG. 4 illustrates an example directed acyclic graph (DAG) in the network.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

Moreover, in many cases, LLN devices communicate using a frequency-hopping, or channel hopping, link layer (the terms "frequency" and "channel" may be used interchangeably herein). This approach may be driven both by regulatory compliance and the fact that channel hopping systems offer better spectral efficiency. Frequency-hopping, also referred to as "frequency-hopping spread spectrum" (FHSS), is a method of transmitting radio signals by rapidly switching a carrier among numerous frequency channels, e.g., using a pseudorandom sequence known to both transmitter and receiver. For example, frequency-hopping may be utilized as a multiple access method in the frequency-hopping code division multiple access (FH-CDMA) scheme. Generally, as may be appreciated by those skilled in the art, transmission using frequency-hopping is different from a fixed-frequency transmission in that frequency-hopped transmissions are resistant to interference and are difficult to intercept. Accordingly, frequency-hopping transmission is a useful technique for many applications, such as sensor networks, LLNs, military applications, etc.

Figure 5:
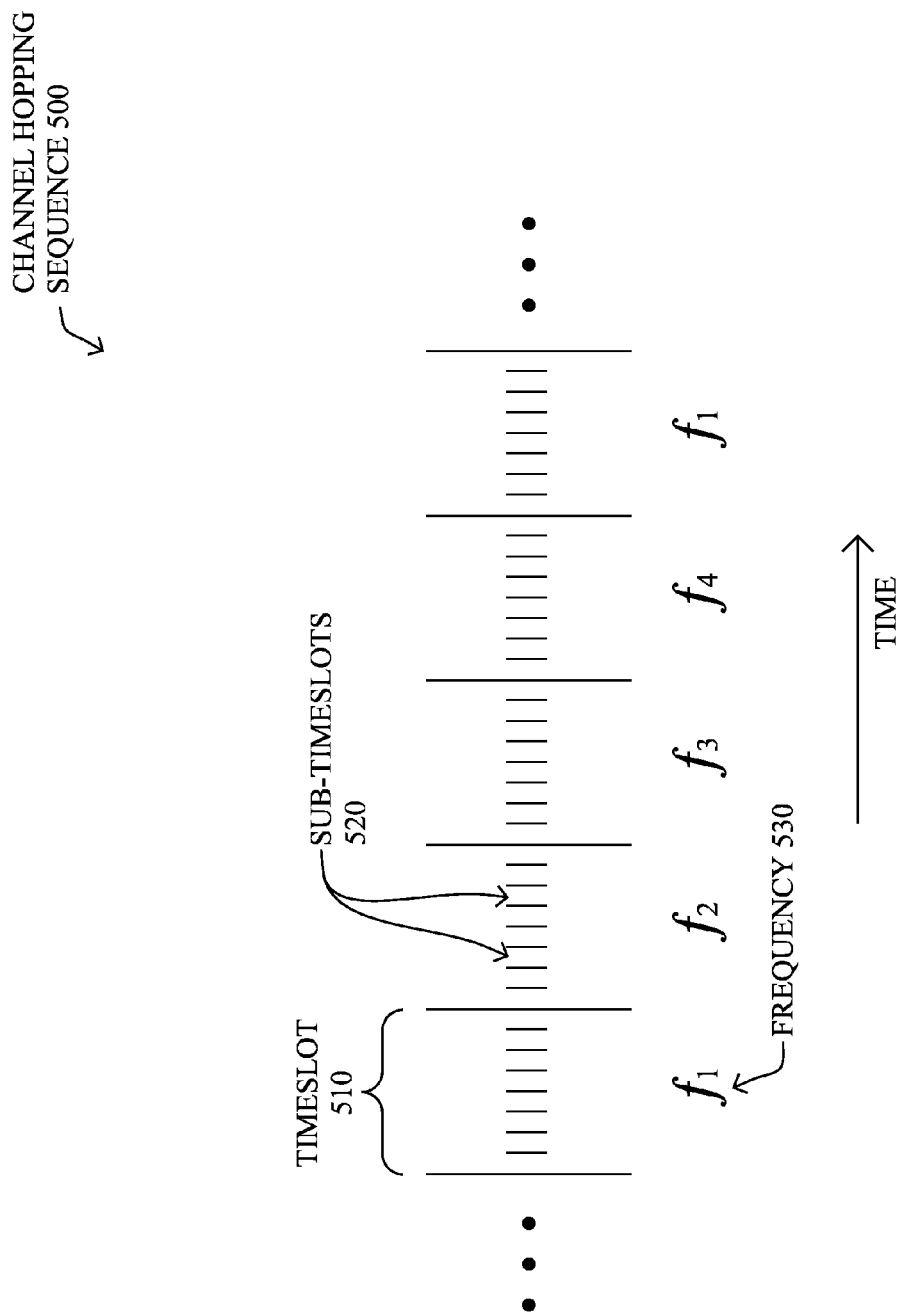
FIG. 5 illustrates an example channel hopping sequence.

In general, as shown in FIG. 5, in frequency-hopping wireless networks, time frames are divided within a frequency-hopping sequence 500 into regular timeslots 510, each one operating on a different frequency 530 (e.g., $f_1$-$f_4$). A reference clock may be provided for the time frames for an entire network (e.g., mesh/cell), or at least between pairs of communicating devices. A MAC layer (of network interface 210) of each node 200 divides time into timeslots that are aligned with the timeslot boundary of its neighbor. Also, each timeslot 510 may be further divided into sub-timeslots 520. (Note that not all frequency-hopping systems use sub-timeslots, and devices can begin transmission at any time within a timeslot; the view herein is merely one example.) Illustratively, the MAC layer is in charge of scheduling the timeslot in which a packet is sent, the main objective of which generally being randomization of the transmission time in order to avoid collisions with neighbors' packets. Note that the MAC layer must not only schedule the data messages coming from upper layers of a protocol stack, but it also must schedule its own packets (e.g., acknowledgements, requests, beacons, etc.).

A device in the frequency-hopping network configures its receiver to follow a hopping schedule by picking a channel/frequency sequence, duration of each timeslot, and time base that defines when the first slot in the schedule begins. To then communicate a packet, the transmitter and receiver must be configured to the same channel/frequency during the packet transmission, i.e., synchronized. All devices in a given network may utilize the same hopping schedule (i.e., all devices are configured to use the same channel sequence, time slot duration, and a common time base), resulting in a network where all communication in the network at any given point in time utilizes the same channel. Alternatively, each transmitter-receiver pair may utilize different hopping schedules (i.e., each pair may differ in channel sequence, time slot duration, and/or time base), such that transmitter-receiver pairs may communicate at the same time but on different channels. Moreover, timeslots between different devices can, in fact, be out-of-phase, and may have no relationship with each other. The latter approach may be preferable, at times, as it can add to the overall robustness and versatility of the communication network.

Figure 6:
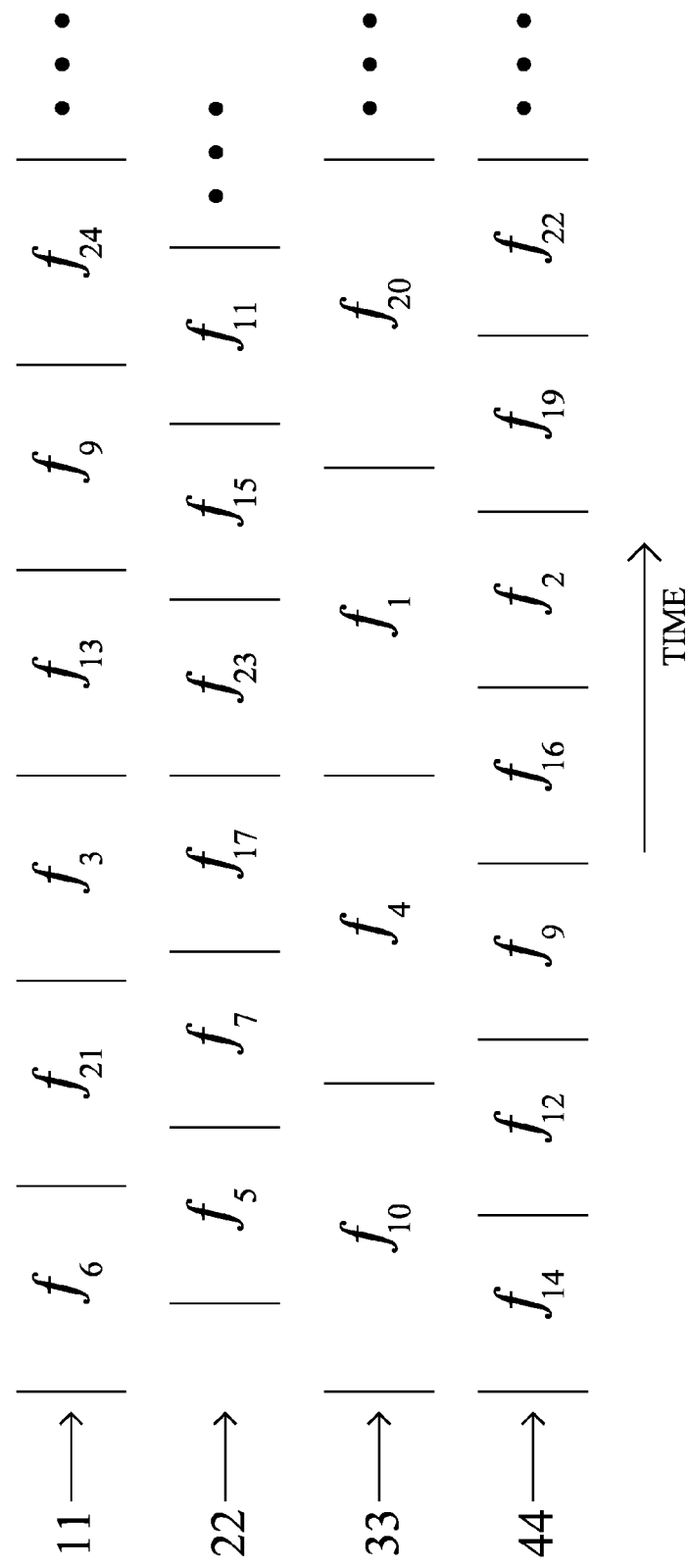
FIG. 6 illustrates example independently determined and independently timed channel hopping sequences.

FIG. 6 illustrates an example of independently determined local unicast listening schedules 600 that may be independently computed by each individual device, "11," "22," "33," and "34," respectively. A device synchronizes its listening, or "hopping," schedule with another device by communicating its channel sequence, time slot duration, and current time within the schedule. Hopping schedule parameters may be communicated in explicit synchronization packets and/or piggybacked on existing data packets. As mentioned, some of these parameters (e.g., channel sequence) may be network-wide and implicit. Devices store these parameters to know what channel to use for transmission at a particular time. However, it is possible that devices may not know the addresses of neighboring devices. Therefore, link-layer broadcast communication may be necessary, as it does not require any synchronization to communicate with neighboring devices. For example, IEEE 802.15.4 Enhanced Beacon Requests (EBRs) and Enhanced Beacons (EBs) are used by devices to discover neighboring networks. This type of broadcast communication is considered "asynchronous," since the network devices are not synchronized to a common channel schedule.

Figure 7A:
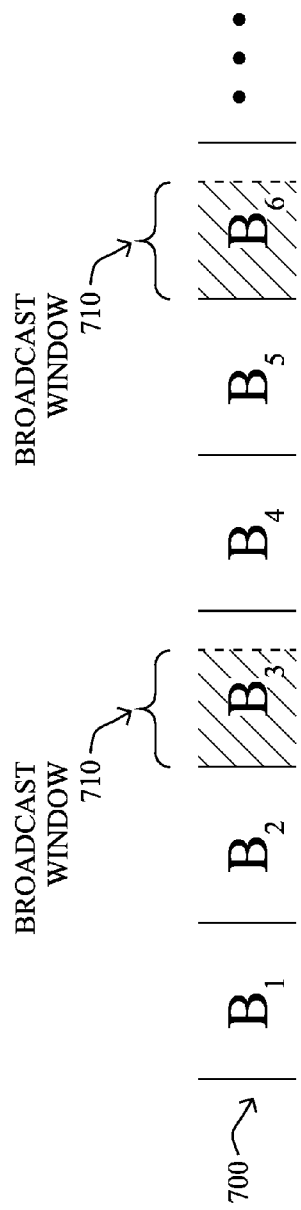
FIGS. 7A-7B illustrate example broadcast schedule overlays.
Figure 7B:
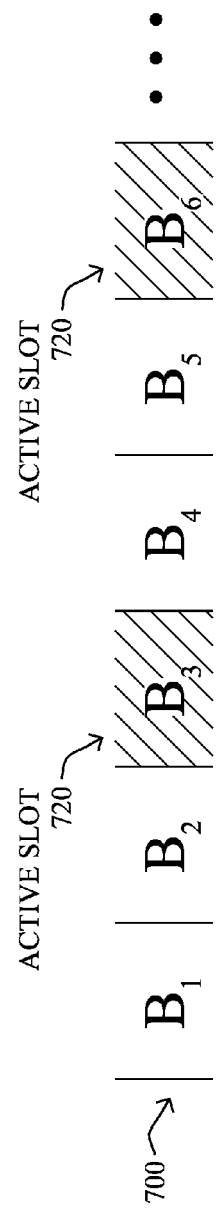

FIGS. 7A-7B illustrates an example broadcast schedule (sequence) 700, showing example frequencies $B_1$-$B_6$. Typically, all nodes in the network synchronize to only one broadcast schedule. The slot timing of broadcast slots in the common broadcast schedule may generally be independent of slot timing of unicast slots in the local unicast listening schedule. Note that while the broadcast schedule 700 is shown with a frequency or channel designated in each timeslot (from which particular portions are selected for use), the techniques herein may also simply populate the schedule with those broadcast slots that are to be used (e.g., only $B_3$ and $B_6$, as shown below). The broadcast schedule may be established by a single root node and distributed to all other nodes using any standard dissemination protocol (e.g., simple flood, Trickle-based dissemination, etc.). Note that the dissemination protocol may utilize unsynchronized transmissions, particularly where no schedule has yet been established. The root node may be administratively assigned (e.g., by an IEEE 802.15.4 PAN coordinator, Field Area Router, etc.) or automatically discovered.

A broadcast schedule may be defined by the following parameters:

1.) Broadcast Window: specifies how long a node listens for broadcast messages within a broadcast slot. FIG. 7A illustrates an example of broadcast windows 710, during which the common broadcast schedule is to be used (a configured portion overlaying the unicast schedules). Broadcast windows may be found in only specific timeslots as shown, or else may be the initial portion (e.g., one or more sub-timeslots) of every timeslot of the sequence. Broadcast packets must start their transmission within the Broadcast Window to ensure that all neighboring nodes are listening for the broadcast transmission. The Broadcast Window must specify a time that is no greater than the Slot Duration. At the beginning of each designated broadcast slot, the node switches to the next channel in the broadcast schedule to listen for broadcast transmissions. At the end of the Broadcast Window, the node returns to listening for unicast transmissions until the start of the next broadcast slot. The unicast schedule is free running and the timing remains unaffected by the broadcast schedule. In other words, the broadcast schedule is overlaid on a node's unicast schedule. Note that in one embodiment, the Broadcast Window may utilize one or more sub-timeslots starting at different offsets within each broadcast slot. For example, the Broadcast Window may start on sub-slot X in slot 1, Y in slot 2, Z in slot 3, etc. The sub-slot start time may be specified as part of the broadcast channel sequence, where each slot indicates not only channel but sub-slot offset.

2.) Active Slot Period (instead of or in addition to a Broadcast Window): specifies which slots within a broadcast schedule are used to listen for broadcast transmissions. For example, an Active Slot Period of 10 would indicate that the node listens for broadcast communication every tenth slot of the broadcast schedule. During the other 9 out of 10 slots, the device follows its own unicast schedule and listens for unicast communication. FIG. 7B illustrates an example of an active slot period, e.g., of 3, where every third slot of the common broadcast schedule is a time during which the common broadcast schedule is to be used (e.g., corresponding to $B_3$ and $B_6$).

Notably, the configured portion of the common broadcast schedule that is used to overlap the unicast schedules, e.g., the Broadcast Window size and/or Active Slot Period, can be adjusted to configure the amount of time that a network spends listening for broadcast traffic rather than unicast traffic, as described in greater detail below.

According to the illustrative technique, the common broadcast schedule 700 overlays each individual device's unicast listening schedule 600, such that the devices operate in a receive mode (listening for transmissions) according to the local unicast listening schedule and the common broadcast schedule during the overlaid configured portion, and operate in a transmit mode according to each neighbor unicast listening schedule and the common broadcast schedule during the overlaid configured portion depending upon a destination of transmitted traffic.

Figure 8:
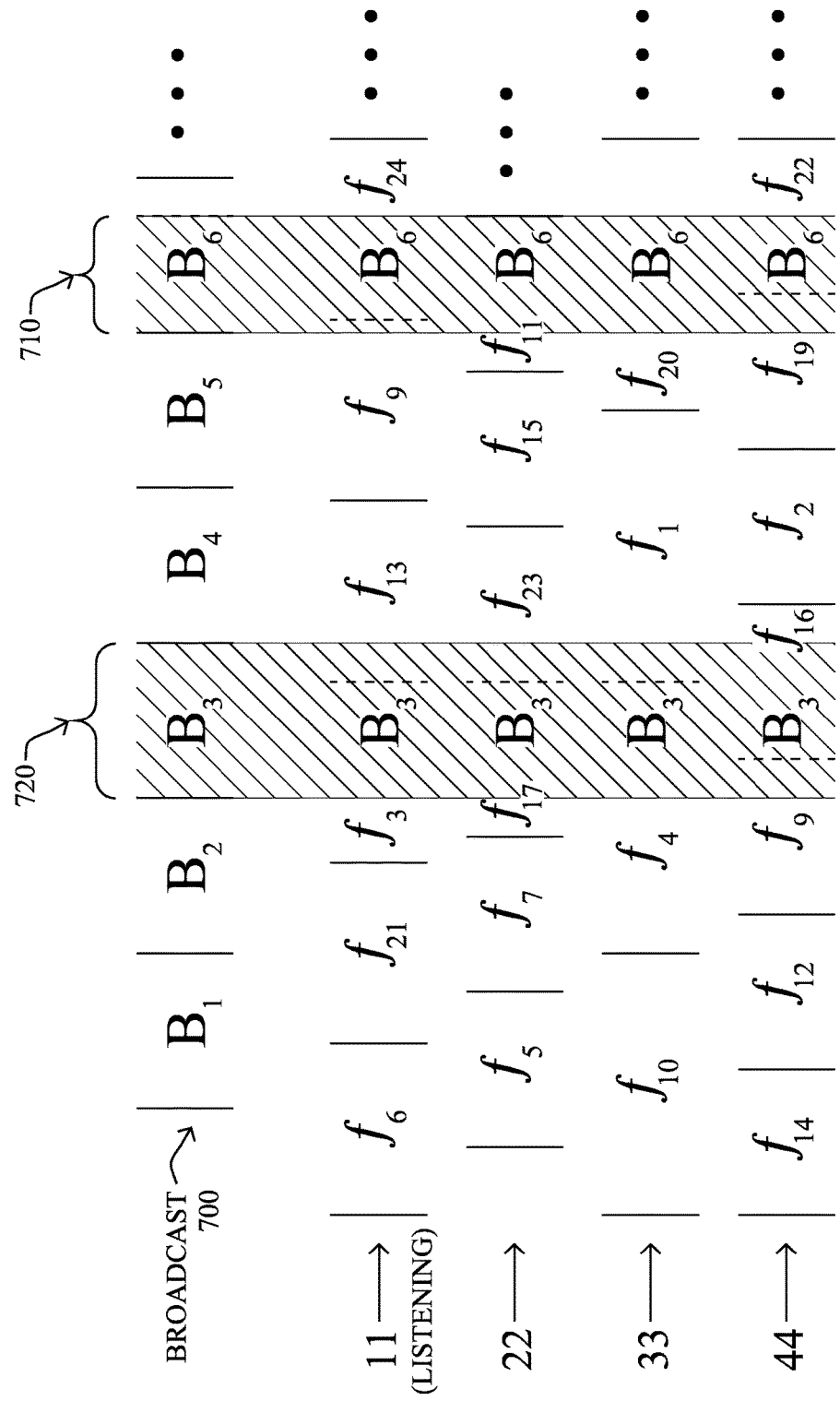
FIG. 8 illustrates an example of a broadcast schedule overlaid on independent unicast sequences.

For example, FIG. 8 illustrates the overlay of the broadcast schedule 700 over the unicast listening schedules 300 of each device in the network. For instance, as can be seen, node 11 listens to its local unicast listening schedule unless the particular overlaid portion of the broadcast schedule dictates that node 11 listen on the broadcast channel at the time. Should node 11 wish to send a transmission to any of its neighbor nodes (22-44), node 11 uses the neighbor's listening schedule according to whether a unicast message or broadcast message is to be used. Note that in FIG. 8, the left side shows an active broadcast slot period 720, while the right side shows a broadcast window 710, though this is merely for illustration. Note further that a combination of slot period 720 and broadcast window 710 may be used, e.g., defining which particular slots of a broadcast schedule to use (period 720), and then further defining a length of time for each of those slots to use (window 710).

In particular, unicast link frames are typically sent using the receiver's (neighbor's) unicast schedule. The link layer maintains a table for neighboring receivers that includes information about the receivers' schedules. If the intended receiver is not resident in the neighbor table, then the message is passed back to higher layers with an error condition. Otherwise, the transmitter determines the appropriate channel given the current time and begins transmission, i.e., transmitting a unicast message to a particular neighbor during a unicast slot based on the corresponding neighbor unicast listening schedule for the particular neighbor. While it may be possible to send unicast frames via the broadcast schedule, this is typically not done due to the loss of spectral efficiency.

Also, broadcast link frames are typically sent using the network's broadcast schedule. The link layer maintains information about the broadcast schedule. If the broadcast schedule is unknown, the message is passed back to higher layers with an error condition. Otherwise, the transmitter wait until the next broadcast window, selects the appropriate channel, and begins transmission at that time, i.e., transmitting a broadcast message into the network during a broadcast slot based on the common broadcast schedule. Typically, the broadcast schedule is only active under normal circumstances for a fraction of the time (e.g., 25%), allowing a tradeoff to be made between unicast and broadcast schedules. Notably, this hybrid approach allows the spectral efficiency of unicast communications to be maximized, while still supporting efficient broadcast communications throughout the network. Also of note is that while it is possible to broadcast frames outside of the broadcast schedule, the probability of a neighbor receiving such a transmission is greatly reduced, but may still be used in some situations (e.g., when device density is high, etc.).

An important application of Smart Grid AMI networks is to provide communication and notification of power outages and power restorations. In some cases, an IoT network may use Power Outage Notification (PON) and corresponding Power Restoration Notification (PRN) messages, to convey information about such an event. In general, PONs allow a utility to determine the occurrence and location of power outages. Similarly, PRNs allow a utility to determine when and where power is restored. For example, a power outage management system (OMS) (e.g., in servers 150) may analyze PONs and PRNs, to determine the current state of the power grid and, if necessary, initiate repairs.

PRNs following PONs are also useful to help determine the power outage duration (e.g., momentary, temporary, or sustained). PRNs may also be used to prevent unnecessary truck rolls that may be triggered by PONs (e.g., the deployment of repair technicians). PRNs may further provide real-time feedback when working to restore power in the field. In particular, when power is being restored to a service area, the field team needs to determine if their job is done or whether a nested outage exists and more works needs to be done in a different but nearby area.

From an operational standpoint, reducing the network formation time and the reporting time of PONs/PRNs below a threshold level may be desirable. For example, one potential goal may be to ensure that network formation and operation occur within one minute after power restoration and that PRNs are communicated with minimal delay. This poses a significant challenge for the link layer, where devices must discover and synchronize with each neighbor's channel hopping schedule individually, as described above. A typical Smart Grid AMI network may have hundreds of devices within communication range. Even if synchronization required only a single broadcast message from each neighbor, this would involve hundreds of messages within a minute. This can far exceed the communication capacity of Smart Grid AMI networks.

Fast Network Formation after Network Power Restoration

The techniques herein provide a method for fast network formation and operation following a power restoration event. In particular, the techniques herein rely on the fact that a power restoration event typically occurs at nearly the same time for devices within close physical proximity of one another. In a first aspect, the devices may use the power restoration event to synchronize the time needed for their channel hopping schedule communications. Notably, when a device powers up due to a power restoration event, it may enter a power restoration mode and manage a device-specific channel hopping schedule that is rooted/synchronized to the power restoration event. By using the power restoration event as a synchronization event, devices no longer need to discover and synchronize with neighbors explicitly before communication can occur. In another aspect, the devices may use different channel hopping/transmission parameters while in the power restoration mode (e.g., by using longer dwell times, larger guard boundaries, etc.). In yet another aspect, the techniques herein allow a subset of nodes experiencing power restoration to discover nodes that were not affected by the power outage. In a further aspect, devices in the power restoration mode may be switched to a normal mode of operation after a certain amount of time after the power restoration event.

Illustratively, the techniques described herein may be performed by hardware, software, and/or firmware, such as in accordance with the "network formation" process 248/248a, which may contain computer executable instructions executed by the processor 220 (or independent processor of interfaces 210) to perform functions relating to the techniques described herein, e.g., in conjunction with routing process 244. For example, the techniques herein may be treated as extensions to conventional protocols, such as various routing protocols (e.g., RPL), and as such, may be processed by similar components understood in the art that execute those protocols, accordingly.

Specifically, according to various embodiments, a first device in a network detects a power restoration event subsequent to a power outage event. Power is restored to the first device during the power restoration event. The first device synchronizes a channel hopping schedule to the detected power restoration event. The first device communicates with a neighboring device of the first device using the channel hopping schedule synchronized to the detected power restoration event. The neighboring device uses a corresponding channel hopping schedule to communicate with the first device that is also synchronized to the power restoration event.

Figure 9A:
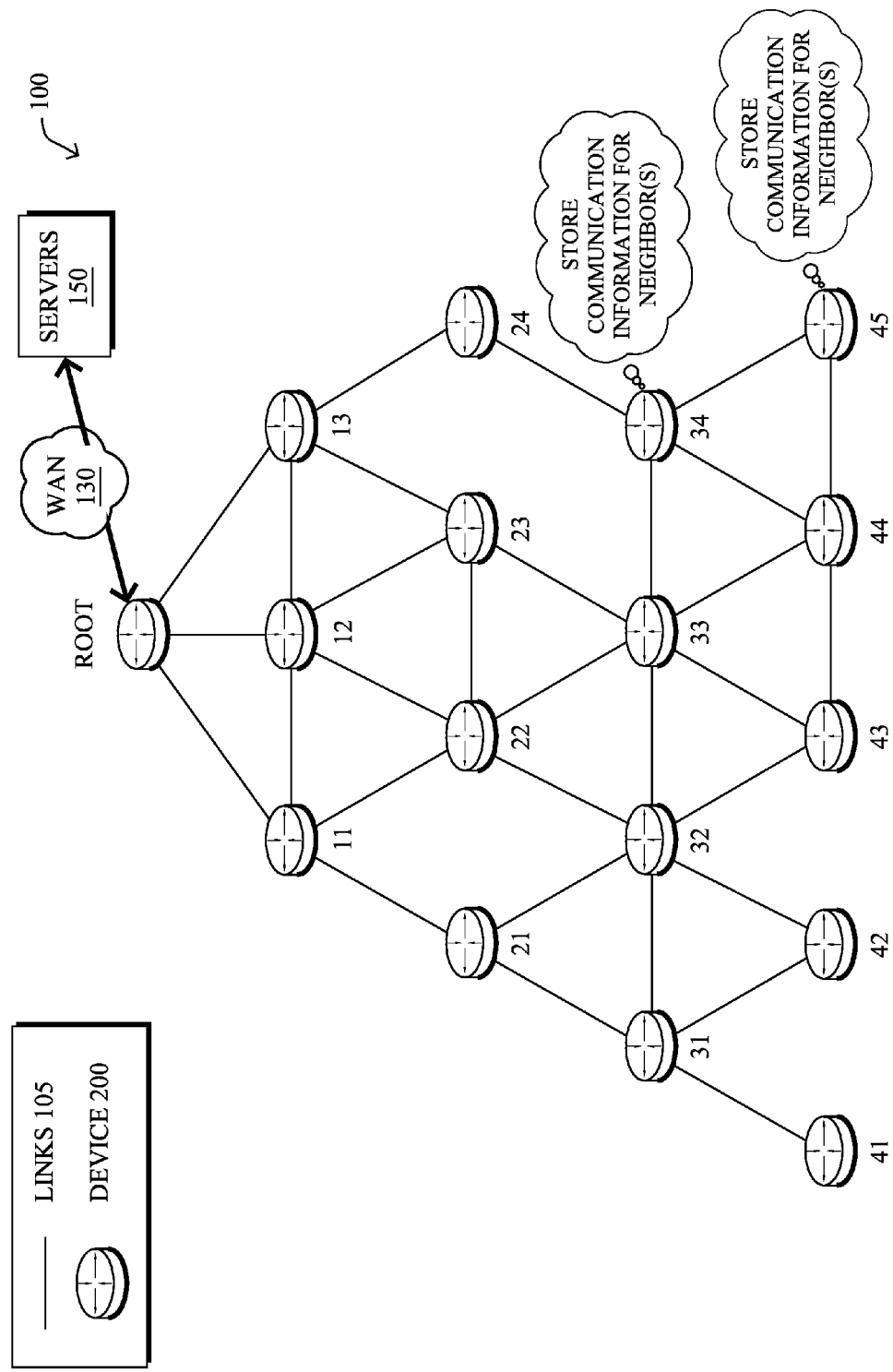
FIGS. 9A-9C illustrate an example of a power restoration event.

Operationally, a power restoration event may be used to synchronize the channel hopping schedules of all devices experiencing the same power restoration event. An example of a power restoration event is shown in FIGS. 9A-9D, according to various embodiments. As shown in FIG. 9A, prior to a power outage event, a device in network 100 (e.g., node 34, 45, etc.) may store any necessary communication information used to communicate with the one or more neighbors of the device. For example, node 34 may store communication information regarding its neighbor node 45 in a persistent memory, prior to the power outage event. In some embodiments, the device may store the communication information periodically. In another embodiment, the device may store the communication information, in response to determining that it is no longer receiving power from its primary power source. In such a case, the device may store the communication information using an auxiliary/backup power source (e.g., a battery backup system, an ultra capacitor, etc.), prior to the device itself losing power due to the power outage event.

In various embodiments, the communication information may include security information, an identifier for the neighbor (e.g., an EUI-64 identifier, etc.), or any other information that may be used by the device to communicate with its neighbor. In one embodiment, the device may also store the actual unicast communication schedule used by the device to communicate with its neighbor.

Figure 9B:
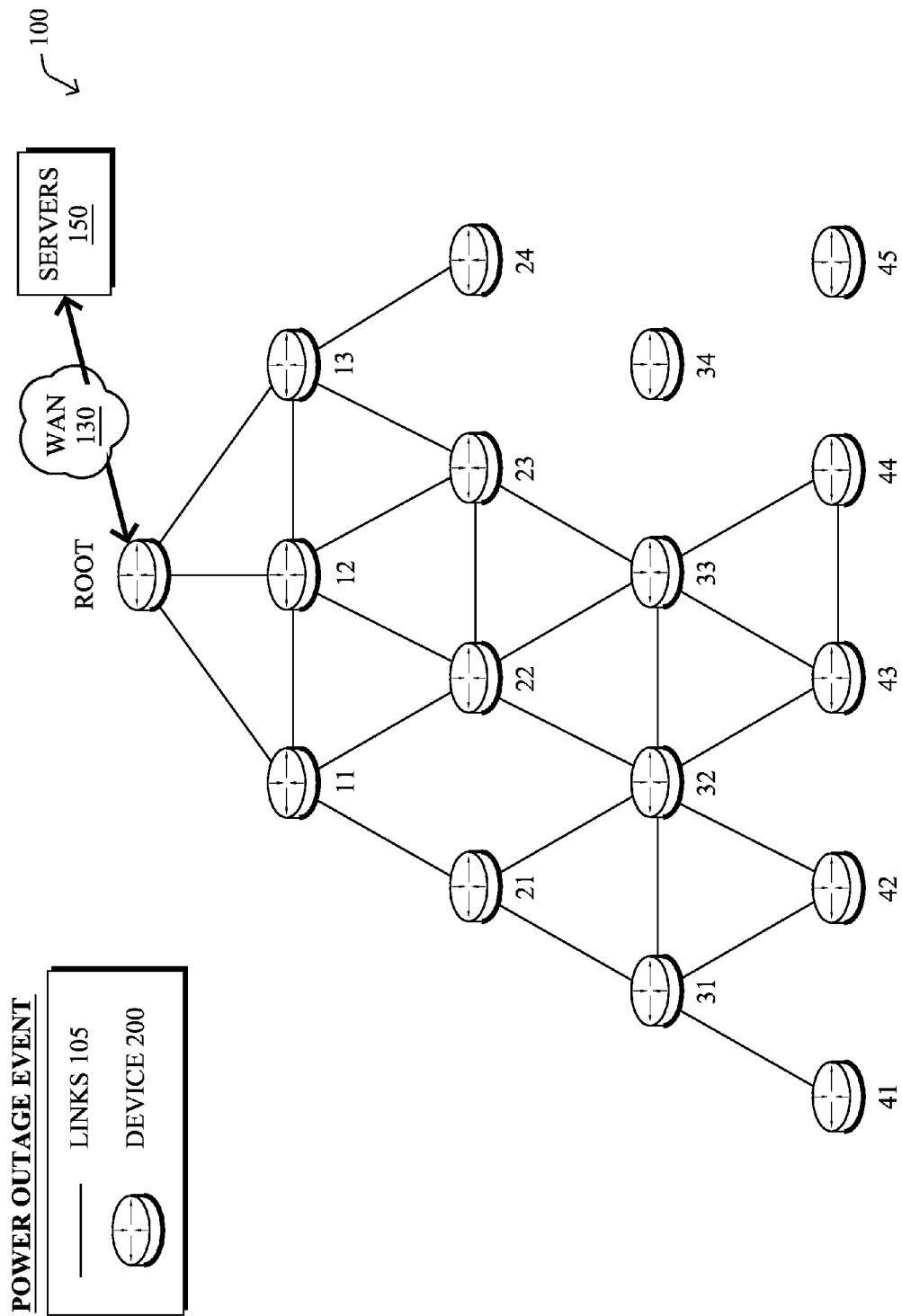

As shown in FIG. 9B, assume that a power outage event occurs in network 100. As a result, both nodes 34 and 45 lose power and, consequently, connectivity to their neighboring nodes. During this time, any of the neighboring nodes (e.g., node 24, etc.) may send a PON to the OMS (e.g., one of servers 150), to notify the service as to the power outage.

Figure 9C:
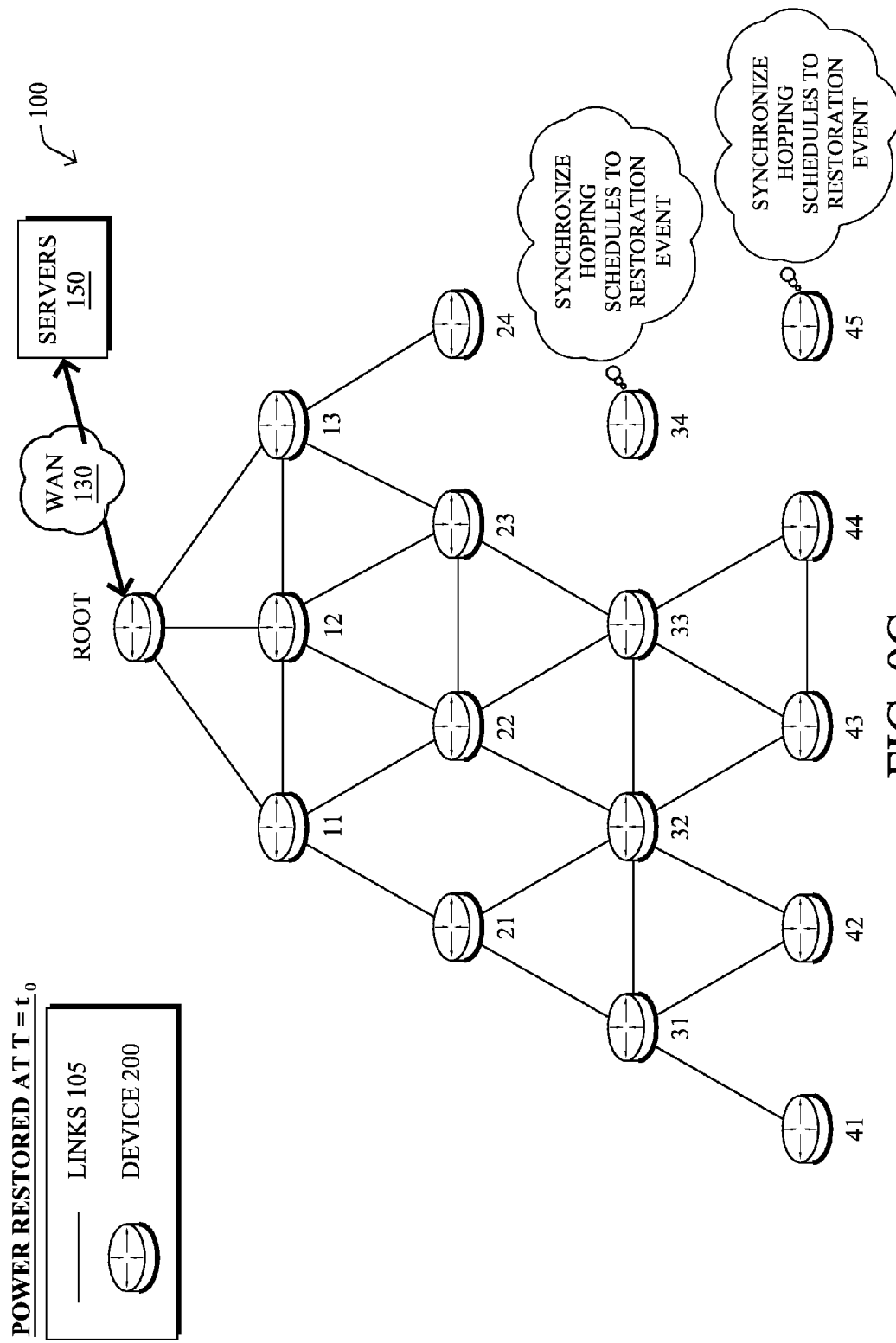

At some point in time after the power outage event (T=$t_0$), power may be restored to nodes 34 and 45, as illustrated in the example of FIG. 9C. In various embodiments, each device affected by the power restoration event may initialize its channel hopping schedule such that the initial time of each schedule is synchronized to the time of the power restoration event (e.g., at T=$t_0$). In doing so, all devices experiencing the same power restoration event are synchronized in time for the channel hopping schedule. As long as the devices save necessary neighbor information upon detecting a power outage (e.g. EUI-64, security information, etc.), the devices may immediately begin communicating with neighbors that have experienced the same power restoration event. Thus, there is no need for the devices to exchange messages first, to synchronize on the channel hopping schedule.

Figure 10A:
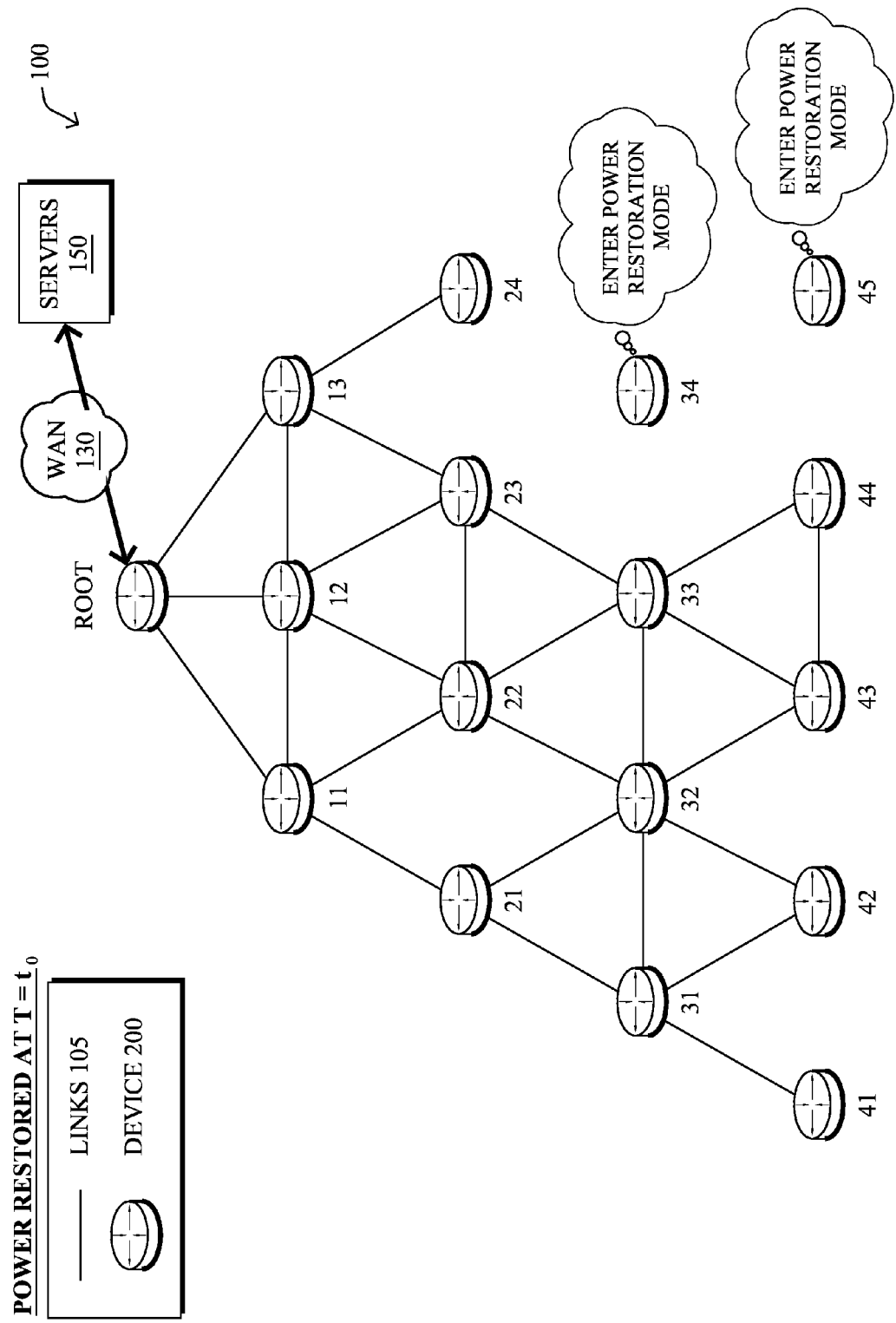
FIGS. 10A-10C illustrate examples of devices entering a power restoration mode.
Figure 10B:
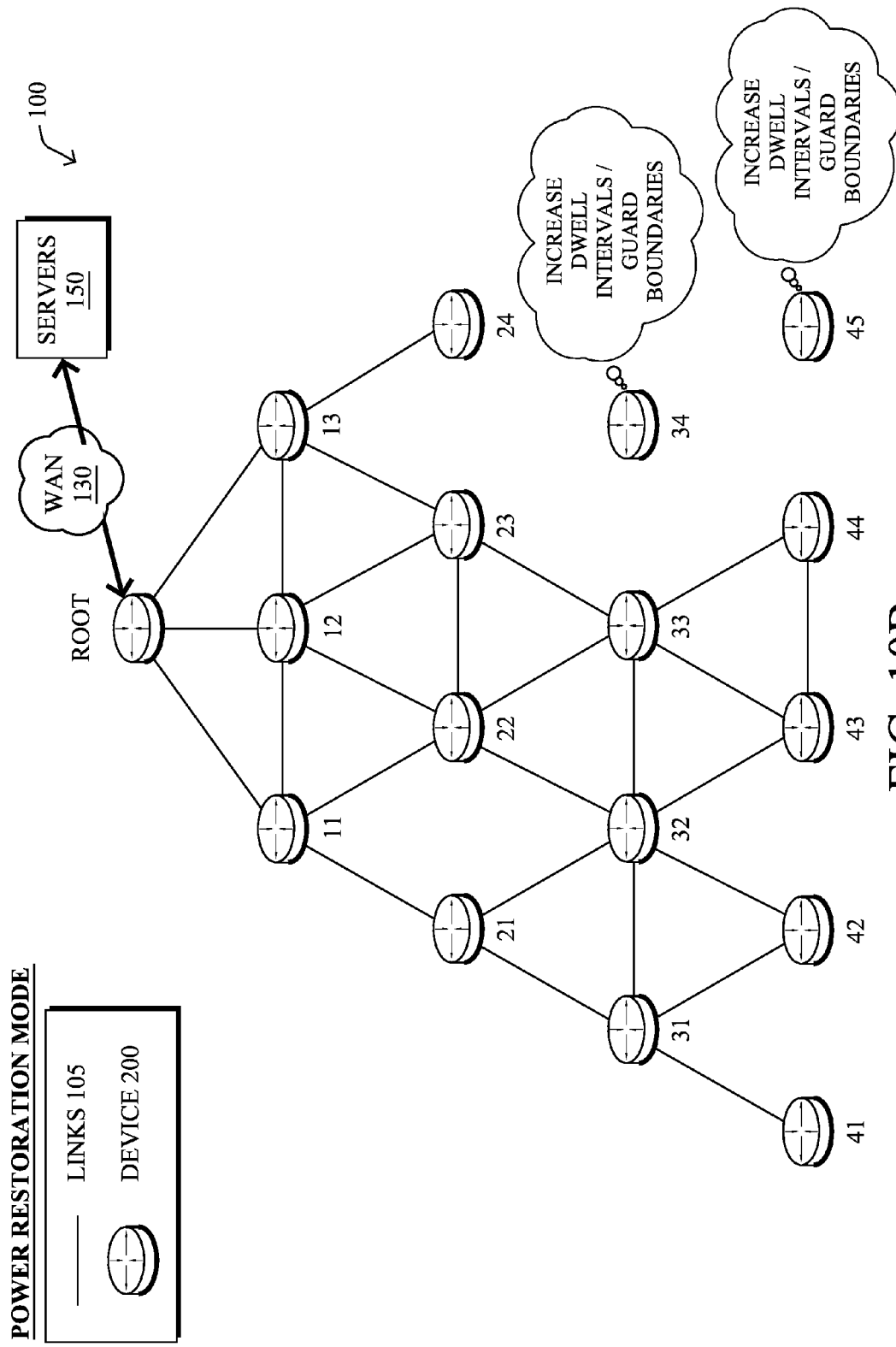
Figure 10C:
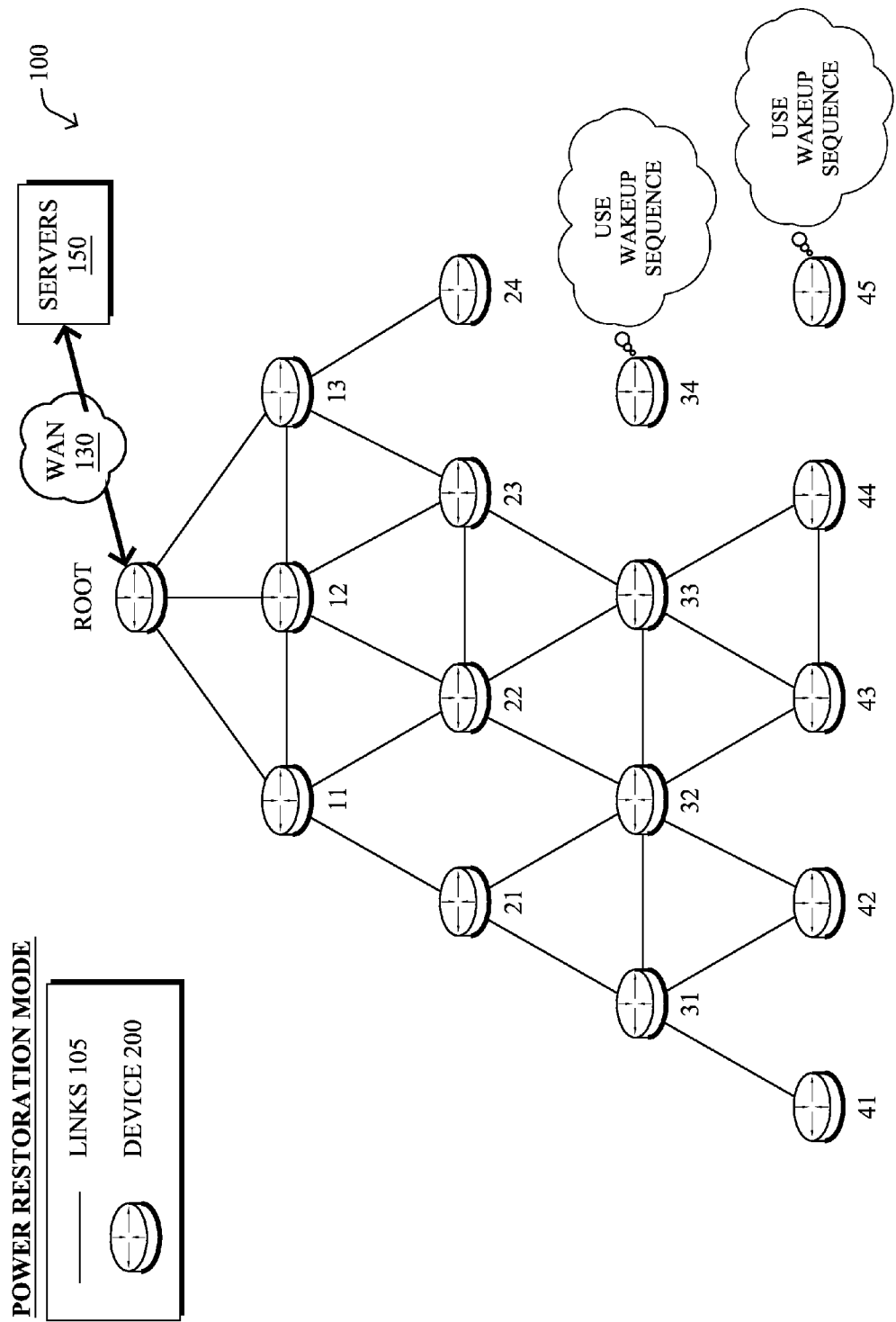

FIGS. 10A-10C illustrate examples of devices entering a power restoration mode, according to various embodiments. As shown in FIG. 10A, in response to nodes 34 and 45 experiencing the power restoration event, nodes 34 and 35 may enter into a power restoration mode. While in the power restoration mode, a device may use different channel hopping and/or transmission parameters than it would use during a normal mode of operation. In particular, the power restoration event may not provide a synchronization accuracy that is as good as that provided by the link-layer messaging itself during normal operation.

In various embodiments, to account for the synchronization error with respect to the power restoration event, devices may communicate in accordance with a power restoration mode communication policy while in power restoration mode. For example, as part of such a policy, the devices may choose to operate with a larger dwell interval (e.g., how long the device stays on a particular channel) and/or guard boundaries (e.g., time buffers built into a channel hopping time slot to account for slight synchronization variations), than would normally be used by the devices. For example, as shown in FIG. 10B, the channel hopping schedules synchronized to the power restoration event by nodes 34 and 45 may have increased dwell intervals and/or guard boundaries, in comparison to when nodes 34 and 45 communicate in a normal mode. Alternatively, or in addition thereto, devices may also choose to use a wakeup sequence to allow for greater synchronization error, in other embodiments. For example, the device may use a wakeup sequence as defined in the IEEE 802.15.4e-2012 standard, while in power restoration mode. For example, as shown in FIG. 10C, nodes 34 and 45 may use such a wakeup sequence, after entering into their power restoration modes.

Figure 11A:
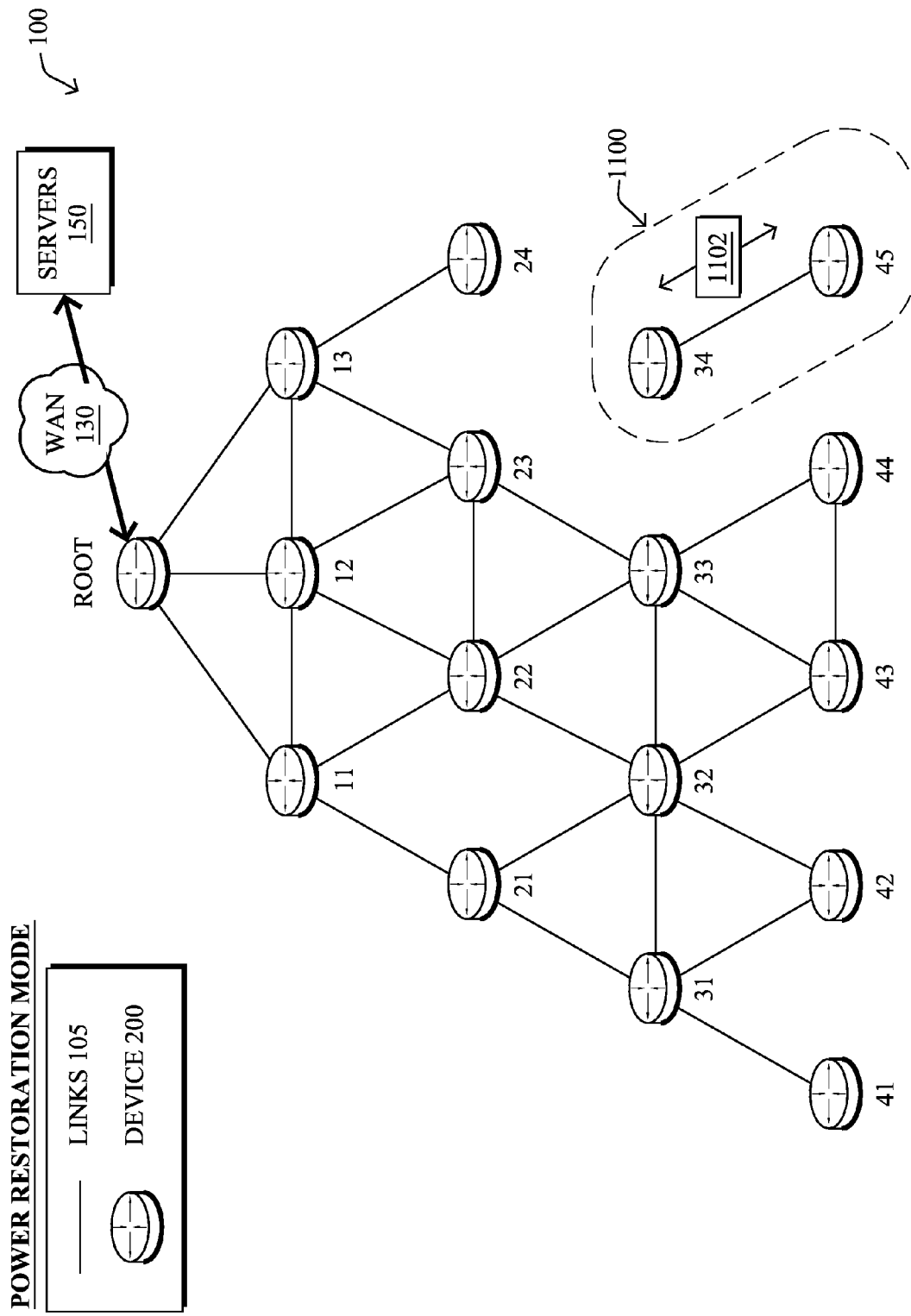
FIGS. 11A-11C illustrate an example of devices rejoining the network.
Figure 11B:
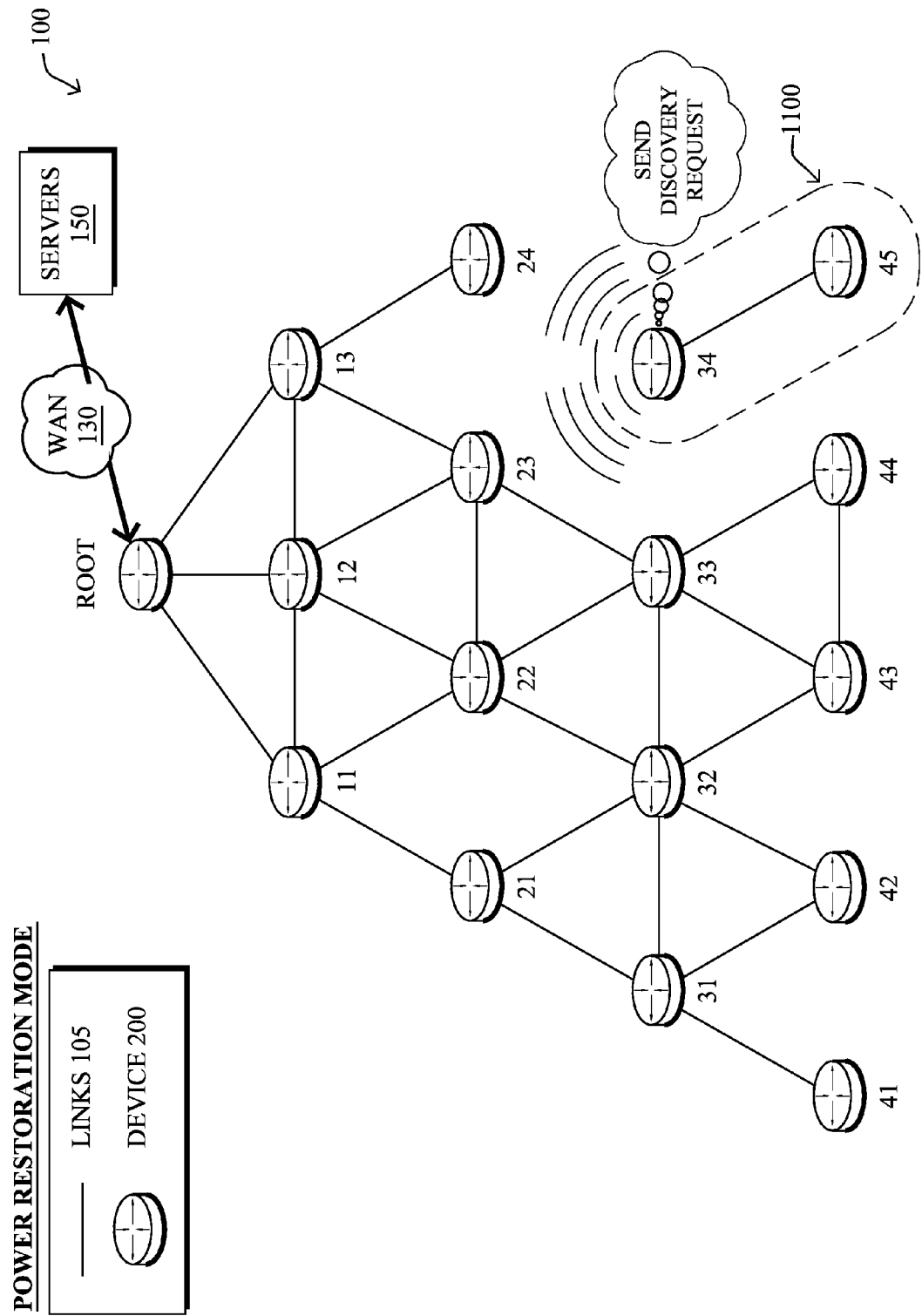
Figure 11C:
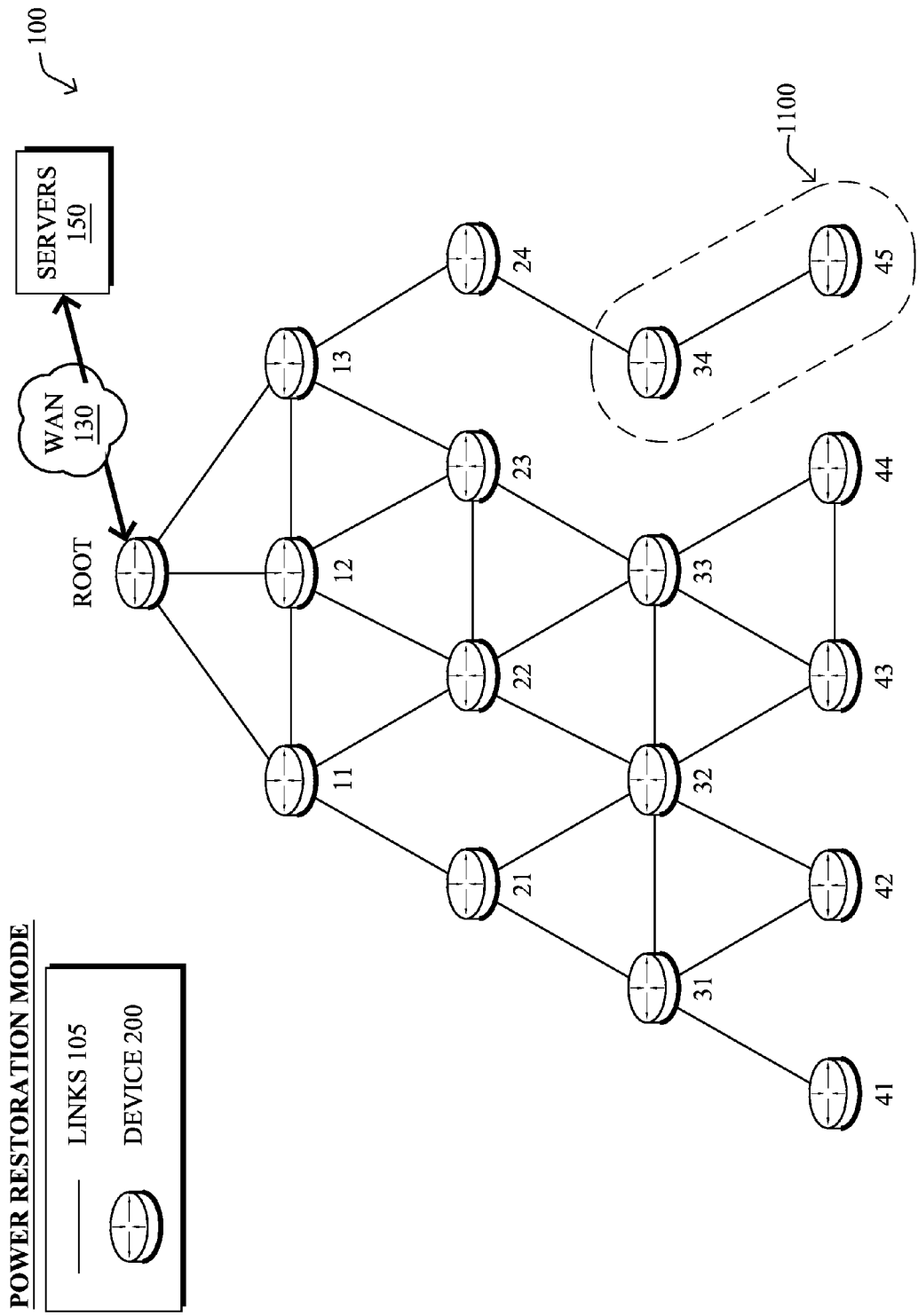

Referring now to FIGS. 11A-11C an example of devices rejoining the network is shown, according to various embodiments. Using the techniques detailed above, devices experiencing the same power restoration event are able to communicate efficiently and without first having to exchange hopping schedule information. However, the same devices may not be synchronized with any of the other devices that were powered on before the power restoration event. In other words, the set of devices experiencing the same power restoration event may form a connected island. For example, as shown in FIG. 11A, nodes 34 and 45 may be able to communicate data 1102 with one another after the power restoration event using the above techniques, thereby forming a subset 1100 of nodes that still lacks connectivity to the rest of network 100. To provide external connectivity to the larger network, the nodes in subset 1100 may still need to explicitly synchronize with any of the other neighboring devices that either never lost power or regained power prior to that of the nodes in subset 1100 (e.g., via a different power restoration event).

In various embodiments, a subset of nodes that experienced a power restoration event may discover neighboring devices that are currently powered on, but did not experience the same power restoration event as those in the subset. Some of those devices must synchronize with other powered devices (e.g., the Root/FAR, other network nodes, etc.), to provide connectivity outside of the subset. For example, as shown in FIG. 11B, one or more of the nodes in subset 1100 may send a discovery request 1104, to discover any of the neighboring devices outside of subset 1100.

The devices in a subset of devices that experienced a power restoration event may rejoin the larger network in a variety of ways. In one embodiment, the devices may use a probabilistic method using Trickle suppression, to determine which of the nodes in the subset attempt to discover neighbors outside of the subset. For example, the devices may choose a random time within a time window and transmit a discovery message only if a device has not recently received a similar discovery message from a neighboring device. In another embodiment, the discovery may be based on the stored routing topology (e.g., the devices may attempt to communicate with one or more of their DAG parents). For example, as shown in FIG. 11C, node 34 may attempt to reach its DAG parent, node 24, to restore its corresponding link. If a device cannot reach any of its DAG parents, that device may then transmit a discovery message. Note that these two methods are complimentary and both the Trickle suppression and routing-based methods may be used, in other embodiments. In some embodiments, the discovery message may itself be a power restoration notification (PRN) message.

Figure 12A:
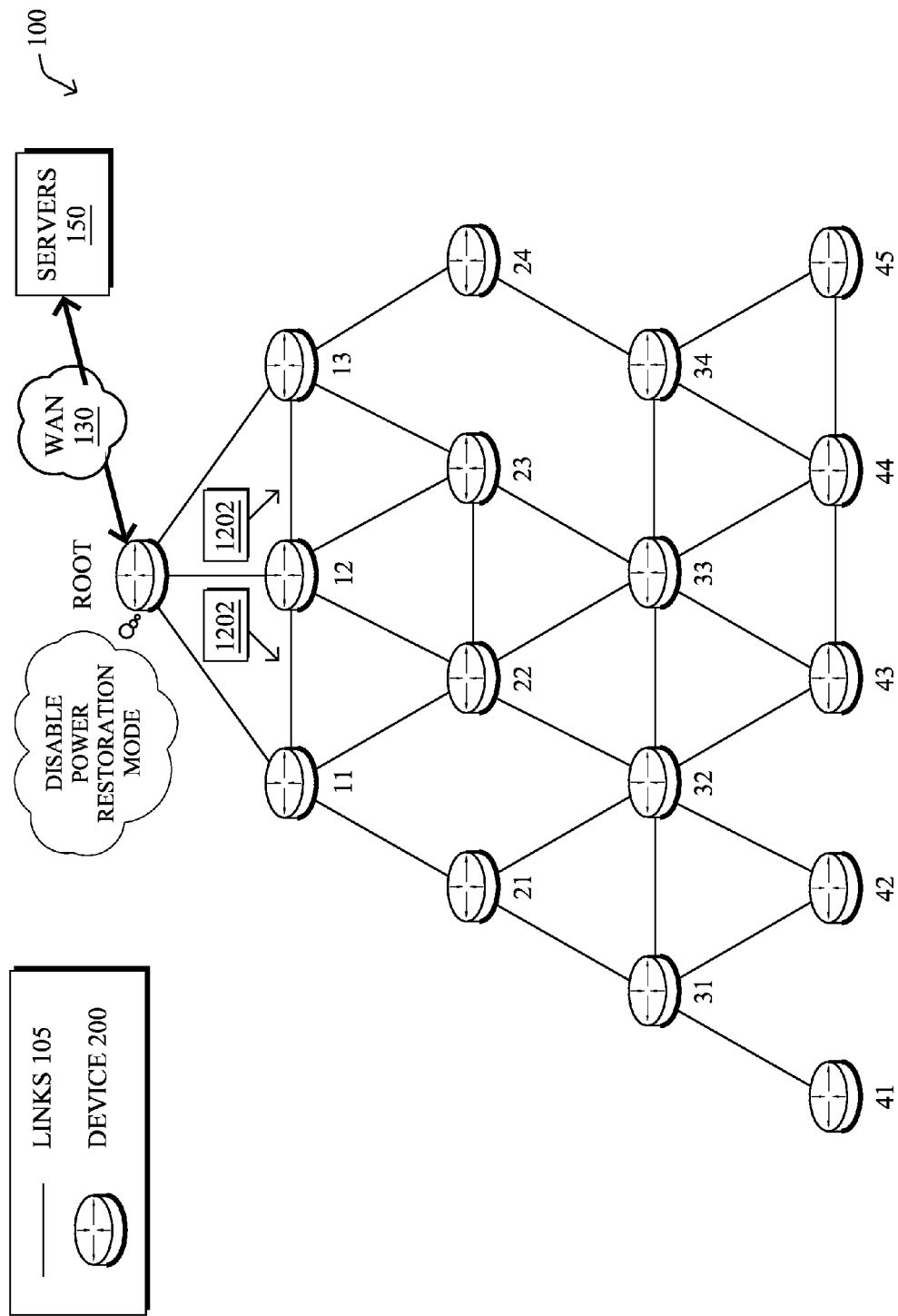
FIGS. 12A-12B illustrate examples of devices exiting a power restoration mode.
Figure 12B:
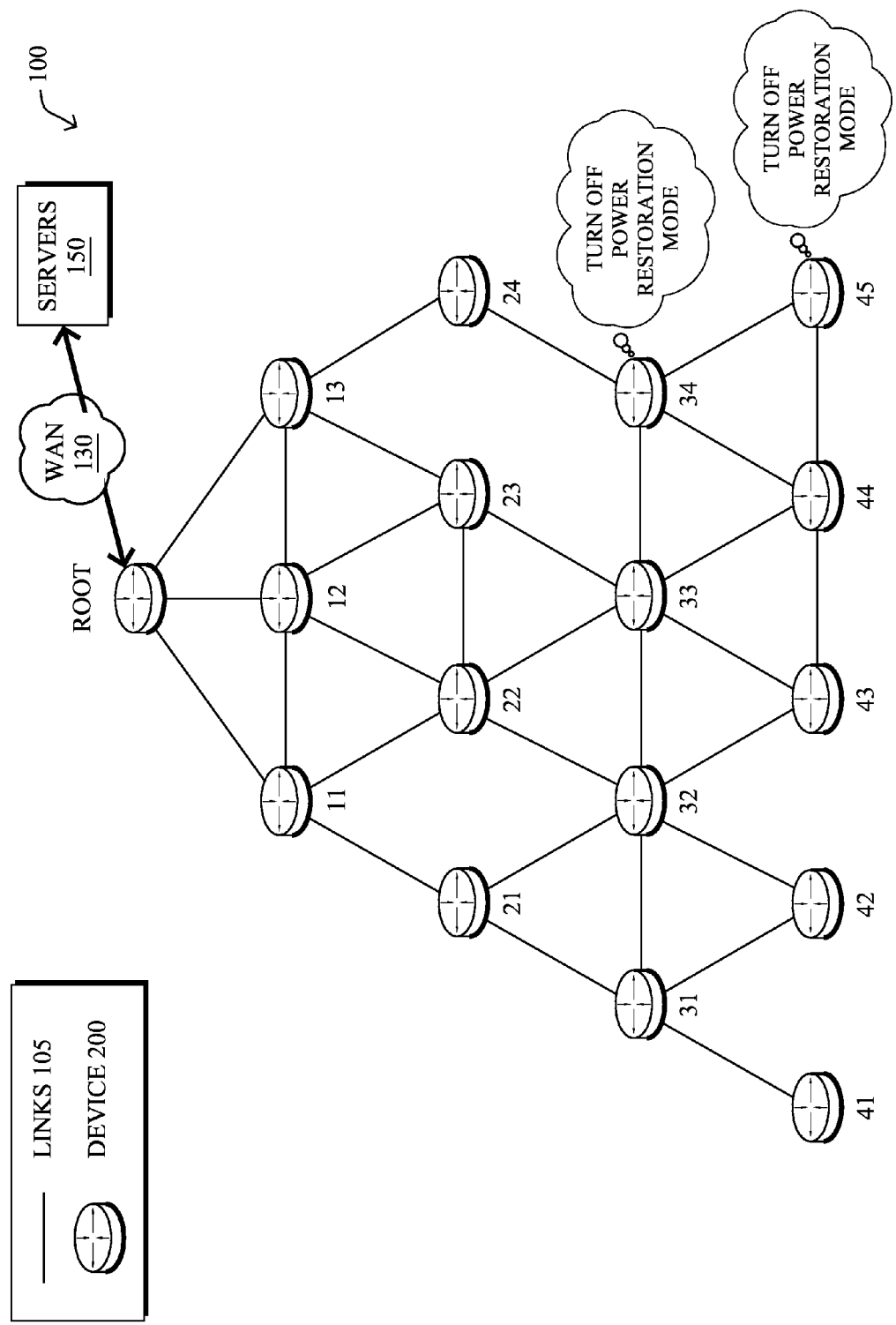

Referring now to FIGS. 12A-12B, examples of devices exiting a power restoration mode are shown, according to various embodiments. Typically, the power restoration mode may be used by the devices for only a limited period of time following the power restoration event. Notably, the power restoration mode is configured to bring the network up quickly to allow for some limited (but critical) messaging soon after the power restoration event. However, once the important messaging has been completed, the network can revert to its normal mode of operation.

In one embodiment, the network may be switched back to normal mode using an explicit message that is multicast from the Root/FAR. For example, as shown in FIG. 12A, the FAR/Root may send multicast instruction messages 1202 into the network, to cause any of the devices in the power restoration mode to switch to a normal mode of operation. In one embodiment, messages 1202 may indicate an absolute time such that all devices switch to the normal mode of operation at the same time.

In response to receiving a message 1202, or based on one or more local decisions, nodes 34 and 45 may exit the power restoration mode. For example, in another embodiment, the network devices may switch after some time relative time threshold has passed (e.g., after a certain amount of time after the power restoration event, etc.). In yet another embodiment, the devices may gradually switch in a random fashion or based on the routing topology (e.g., using RPL Rank, etc.), to reduce the impact of any resynchronization required when a device changes its channel hopping parameters. In some embodiments, the devices may first obtain the information on the new hopping schedules before actually using them for communication, allowing for a more graceful switchover.

Figure 13:
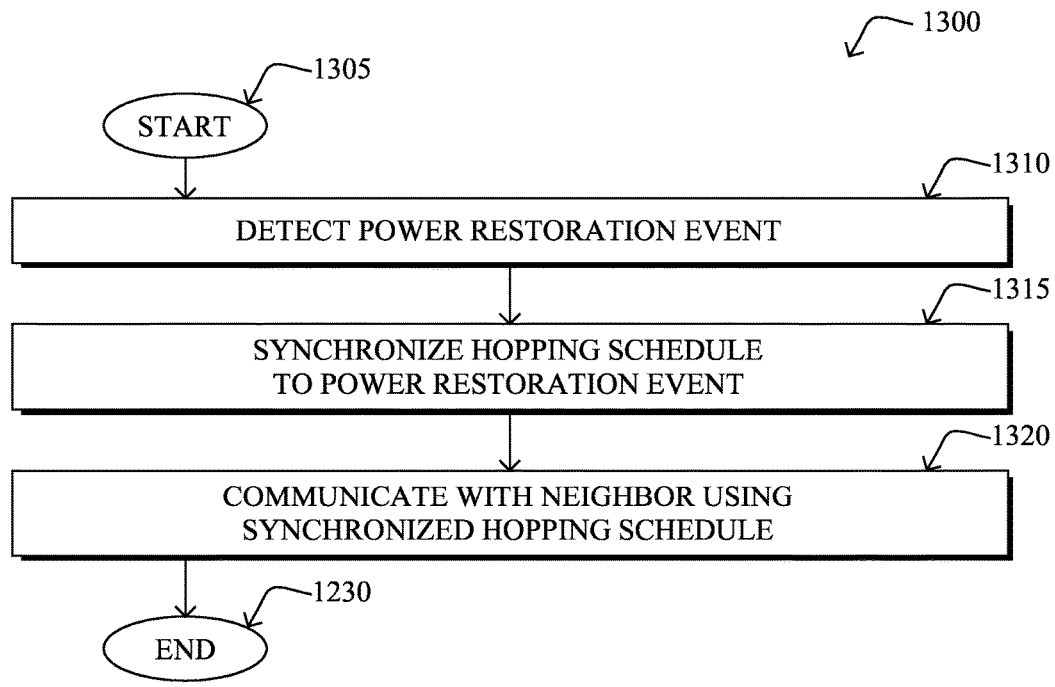
FIG. 13 illustrates an example simplified procedure for performing fast network restoration after network power restoration.

FIG. 13 illustrates an example simplified procedure for performing fast network restoration after network power restoration, in accordance with the embodiments herein. The procedure 1300 may begin at step 1305 and continue on to step 1310 where, as described in greater detail above, a device in a network may detect a power restoration event during which power is restored to the device, as detailed above. For example, the device may begin receiving power again from a power line during the power restoration event. In various embodiments, the device may determine the time at which the power restoration event occurred (e.g., when power was restored to the device). In the context of LLNs and in Smart Grid AMI applications, in particular, multiple devices may experience the same power restoration event at the same time.

At step 1315, the device synchronizes a channel hopping schedule used by the device to communicate with its neighbor to the power restoration event, as described in greater detail above. Notably, since multiple devices often begin receiving power again at the same time, the event itself may be used to imitate the channel hopping schedules used by the devices. In various embodiments, the channel hopping schedule synchronized to the power restoration event may be the same channel hopping schedule used by the device to communicate with its neighbor or, alternatively, a default channel hopping schedule used by the device after a power restoration event.

At step 1320, the device may communicate with the neighbor using the channel hopping schedule synchronized to the power restoration event, as described in greater detail above. In particular, the device may communicate with the neighbor, which also uses a corresponding channel hopping schedule that is also synchronized to the power restoration event. Thus, the devices may be able to communicate without first having to negotiate channel hopping schedules with one another, thereby speeding up the join process. Procedure 1300 then ends at step 1325.

Figure 14:
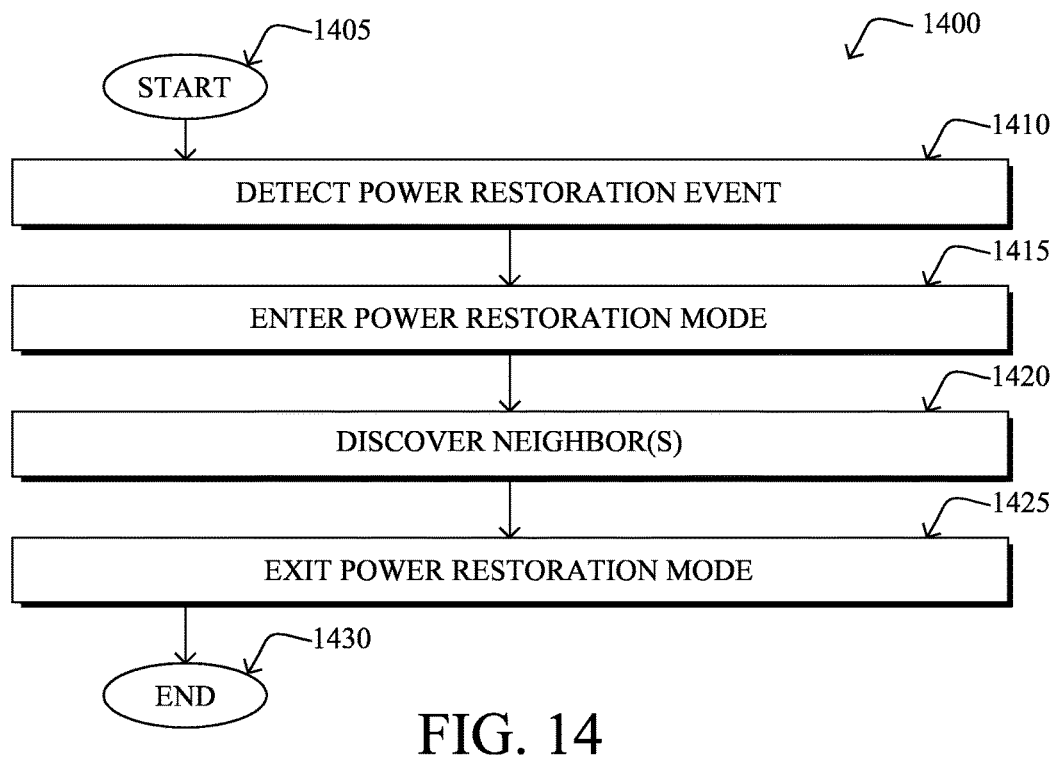
FIG. 14 illustrates an example simplified procedure for using a power restoration mode to join a network after a power outage.

FIG. 14 illustrates an example simplified procedure for using a power restoration mode to join a network after a power outage, according to various embodiments herein. Procedure 1400 may begin at step 1405 and continue on to step 1410 where, as described in greater detail above, a device in a network may detect a power restoration event. For example, the device may detect the point in time at which power is restored to the device after losing power due to a power outage event.

At step 1415, the device may enter into a power restoration mode, as described in greater detail above. When entering this mode, the device may synchronize a channel hopping schedule used by the device to communicate with one of its neighbors to the power restoration event, in various embodiments. In some embodiments, the device may also communicate with one or more of its neighbors in accordance with a power restoration mode communication policy. For example, such a policy may cause the channel hopping schedule to have longer dwell times and/or increased guard boundaries. In another example, the policy may cause the device to follow a wake sequence (e.g., as defined in IEEE 802.15.4e-2012).

At step 1420, as described in greater detail above, the device may attempt to discover one or more of its neighbors that is not synchronized to the power restoration event, as described in greater detail above. Notably, the devices that experienced the power restoration event may be able to communicate with one another, but may not be able to communicate with any of the other network devices that did not experience the power restoration event (e.g., devices that never lost power, devices that came online beforehand, etc.). In one embodiment, the device may attempt to rediscover its parent in the routing topology used by the device prior to the device losing power. In some embodiments, the device may send a discovery request, in response to determining that it cannot communicate with a particular neighbor (e.g., its DAG parent, etc.). In further embodiments, only certain devices in the subset of devices that experienced the power restoration event may attempt to discover an unsynchronized neighbor. For example, the device may only send a discover request if it does not detect a discovery request from another member of the subset within a threshold amount of time. Such an amount of time may be random, in one embodiment. Thus, once the device discovers an unsynchronized device, the subset of devices that experienced the power restoration event may be reconnected to the larger network.

At step 1425, the device exits the power restoration mode, as described in greater detail above. In general, the device may only use the power restoration mode for a limited amount of time, to enable fast restoration of the network and to provide update messages to the OMS. In other words, the device may re-enter a normal communication mode that is characterized by its channel hopping schedules having shorter dwell times, guard boundaries, etc. In one embodiment, the device may exit the power restoration mode, in response to receiving a multicast instruction from a supervisory device (e.g., the Root/FAR, etc.). Such an instruction may indicate a universal time at which all receiving devices are to exit the power restoration mode. In other embodiments, the device may self-determine when to exit the power restoration mode (e.g., based on a threshold amount of time elapsing since the power restoration event, etc.). In some cases, the times at which the devices exit the power restoration mode may be staggered (e.g., the device may exit the power restoration mode at a different time than one of its neighbors). For example, the devices may exit the power restoration mode at times that correspond to their respective distances from the root node. In some cases, the device may also exit the power restoration mode, only after first receiving a normal channel hopping schedule from one of its neighbors. Procedure 1400 then ends at step 1430.

It should be noted that while certain steps within procedures 1300-1400 may be optional as described above, the steps shown in FIGS. 13-14 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1300-1400 are described separately, certain steps from each procedure may be incorporated into each other procedure, and the procedures are not meant to be mutually exclusive.

As would be appreciated, the routing topology for mesh devices may be defined by RF connectivity and not the electric distribution network. While the routing protocol does not consider the electric distribution network, there may exist some correlation in the spatial domain. In other words, nodes in both the RF and electric distribution network that are within close physical proximity are more likely to be connected than those that are not within close physical proximity. For example, devices within a multiple dwelling unit (MDU) are likely to be on the same electric feeder and also have RF connectivity with one another (e.g., the nodes are all on the same power line and are RF neighbors of one another). For this reason, a power outage event can disrupt the routing topology and the devices may share the same power restoration event.

The techniques described herein, therefore, provide for fast network formation after network power restoration. In particular, communication during power outages and power restoration is a critical application function of Smart Grid AMI networks. The techniques herein minimize the time delay between a power restoration event and when communication can occur. The techniques herein also increase the communication capacity offered to critical Smart Grid AMI application traffic by minimizing control traffic that would otherwise be required during normal neighbor discovery and network formation.

While there have been shown and described illustrative embodiments that provide for fast network formation after network power restoration, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with other types of networks and/or protocols. In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as an apparatus that comprises at least one network interface that communicates with a communication network, a processor coupled to the at least one network interface, and a memory configured to store program instructions executable by the processor. Further, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   detecting, by a first device in a network, a power restoration event subsequent to a power outage event, wherein power is restored to the first device during the power restoration event;
   synchronizing, by the first device, a channel hopping schedule of the first device to the detected power restoration event; and
   communicating, by the first device, with a neighboring device of the first device using the channel hopping schedule synchronized to the detected power restoration event, wherein power is restored to the neighboring device during the power restoration event and the neighboring device uses a corresponding channel hopping schedule to communicate with the first device that is also synchronized to the power restoration event.

2. The method as in claim 1, further comprising:
   entering, by the first device, a power restoration mode, in response to detecting the power restoration event, wherein the first device communicates with the neighboring device in accordance with a power restoration mode communication policy while in the power restoration mode.

3. The method as in claim 2, wherein the power restoration mode communication policy corresponds to at least one of: an increased dwell interval for the channel hopping schedule used by the first device to communicate with a neighboring device, an increased guard boundary for the channel hopping schedule used by the first device to communicate with a neighboring device, or using a wakeup sequence.

4. The method as in claim 2, further comprising:
   exiting, by the first device, the power restoration mode, in response to an amount of time after the power restoration event exceeding a threshold time limit.

5. The method as in claim 2, further comprising:
   exiting, by the first device, the power restoration mode, in response to receiving a multicast instruction message from a supervisory device.

6. The method as in claim 5, wherein the multicast instruction message indicates a time at which all receiving devices are to exit the power restoration mode.

7. The method as in claim 2, further comprising:
   exiting, by the first device, the power restoration mode at a different time than when one or more neighbors of the first device exit the power restoration mode.

8. The method as in claim 7, wherein the first device and the one or more neighbors of the first device exit the power restoration mode at times based on their respective distances to a root node in the network.

9. The method as in claim 2, further comprising:
   receiving, at the first device, a new channel hopping schedule to communicate with the neighboring device, prior to exiting the power restoration mode.

10. The method as in claim 1, wherein the channel hopping schedule is stored in a persistent memory of the first device.

11. The method as in claim 1, further comprising:
sending, by the first device, a discovery message to reach one or more unsynchronized neighbors of the first device; and
determining, by the first device, a communication schedule to communicate with a particular unsynchronized neighbor.

12. The method as in claim 11, wherein the discovery message is sent in response to a determination that the first device is unable to communicate with the particular unsynchronized neighbor.

13. The method as in claim 12, wherein the particular unsynchronized neighbor is a parent of the first device in a routing topology used prior to the power outage event.

14. The method as in claim 11, wherein the first device sends the discovery message, in response to a determination that another node has not already sent a discovery message.

15. The method as in claim 14, wherein the first device waits a random amount of time prior to making the determination that another node has not already sent a discovery message.

16. The method as in claim 11, wherein the discovery message is a power restoration notification message.

17. An apparatus, comprising:
one or more network interfaces to communicate with a network;
a processor coupled to the one or more network interfaces and configured to execute a process; and
a memory configured to store the process executable by the processor, the process when executed operable to:
detect a power restoration event subsequent to the power outage event, wherein power is restored to the apparatus during the power restoration event;
synchronize a channel hopping schedule to the detected power restoration event; and
communicate with a neighboring device of the apparatus using the channel hopping schedule synchronized to the detected power restoration event, wherein power is restored to the neighboring device during the power restoration event and the neighboring device uses a corresponding channel hopping schedule to communicate with the first device that is also synchronized to the power restoration event.

18. The apparatus as in claim 17, wherein the process when executed is further operable to:
enter a power restoration mode, in response to detecting the power restoration event, wherein the apparatus communicates with the neighboring device in accordance with a power restoration mode communication policy while in the power restoration mode.

19. The apparatus as in claim 17, wherein the process when executed is further operable to:
send a discovery message to reach one or more unsynchronized neighbors of the apparatus; and
determine a communication schedule to communicate with a particular unsynchronized neighbor.

20. A tangible, non-transitory, computer-readable media having software encoded thereon, the software when executed by a processor of a device operable to:
detect a power restoration event subsequent to the power outage event, wherein power is restored to the device during the power restoration event;
synchronize the channel hopping schedule to the detected power restoration event; and
communicate with a neighbor of the device using the channel hopping schedule synchronized to the detected power restoration event, wherein power is restored to the neighboring device during the power restoration event and the neighboring device uses a corresponding channel hopping schedule to communicate with the first device that is also synchronized to the power restoration event.

21. The computer-readable media as in claim 20, wherein the software when executed is further operable to:
enter a power restoration mode, in response to detecting the power restoration event, wherein the device communicates with the neighbor in accordance with a power restoration mode communication policy while in the power restoration mode.

22. The computer-readable media as in claim 20, wherein the software when executed is further operable to:
send a discovery message to reach one or more unsynchronized neighbors of the device; and
determine a communication schedule to communicate with a particular unsynchronized neighbor.

* * * * *